US012577917B2

(12) United States Patent          (10) Patent No.:     US 12,577,917 B2
    Benjamin et al.                    (45) Date of Patent:        Mar. 17, 2026

(54) METHOD OF OPERATING A GAS TURBINE ENGINE

(71) Applicant: General Electric Company, Cincinnati, OH (US)

(72) Inventors: Michael A. Benjamin, Cincinnati, OH (US); Clayton S. Cooper, Loveland, OH (US); Nayan Patel, Liberty Township, OH (US); Hejie Li, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/765,796

(22) Filed: Jul. 8, 2024

(65) Prior Publication Data

US 2026/0009362 A1      Jan. 8, 2026

(51) Int. Cl.
    *F02C 9/28*        (2006.01)
    *G05B 23/02*       (2006.01)
(52) U.S. Cl.
    CPC ............ *F02C 9/28* (2013.01); *G05B 23/0283* (2013.01)
(58) Field of Classification Search
    CPC ....................................................... F02C 9/28
    See application file for complete search history.

(56) References Cited

U.S. PATENT DOCUMENTS

| | | | |
|---|---|---|---|
| 6,408,258 B1 * | 6/2002 | Richer | G06Q 10/06 |
| | | | 702/182 |
| 7,216,071 B2 | 5/2007 | Volponi | |
| 10,024,187 B2 | 7/2018 | Soares, Jr. et al. | |
| 10,371,064 B2 | 8/2019 | Joshi et al. | |
| 11,300,069 B2 | 4/2022 | Moeckly et al. | |
| 11,542,032 B2 | 1/2023 | Long et al. | |
| 2012/0095662 A1 | 4/2012 | Roy et al. | |
| 2018/0137219 A1 | 5/2018 | Goldfarb et al. | |
| 2018/0297718 A1 * | 10/2018 | Adibhatla | G05B 23/0243 |

FOREIGN PATENT DOCUMENTS

| | | |
|---|---|---|
| EP | 3637386 A1 | 4/2020 |
| WO | 2021/118925 A1 | 6/2021 |

* cited by examiner

*Primary Examiner* — Katheryn A Malatek
(74) *Attorney, Agent, or Firm* — Venable LLP; Edward A. Kmett; Michele V. Frank

(57) ABSTRACT

A method of operating a gas turbine engine includes controlling operating of the gas turbine engine through a first portion of a total operating period utilizing first data of a first control table to control an operational aspect related to an engine operating condition of an estimated performance margin table, selecting one of a second control table through an Nth control table for operating the gas turbine engine through a second portion of the total operating period of the gas turbine engine, and controlling operating of the gas turbine engine through the second portion of the total operating period utilizing the second through N data of the respective control table selected in the selecting to control the operational aspect related to the engine operating condition of the estimated performance margin table.

18 Claims, 15 Drawing Sheets

To/From Controller

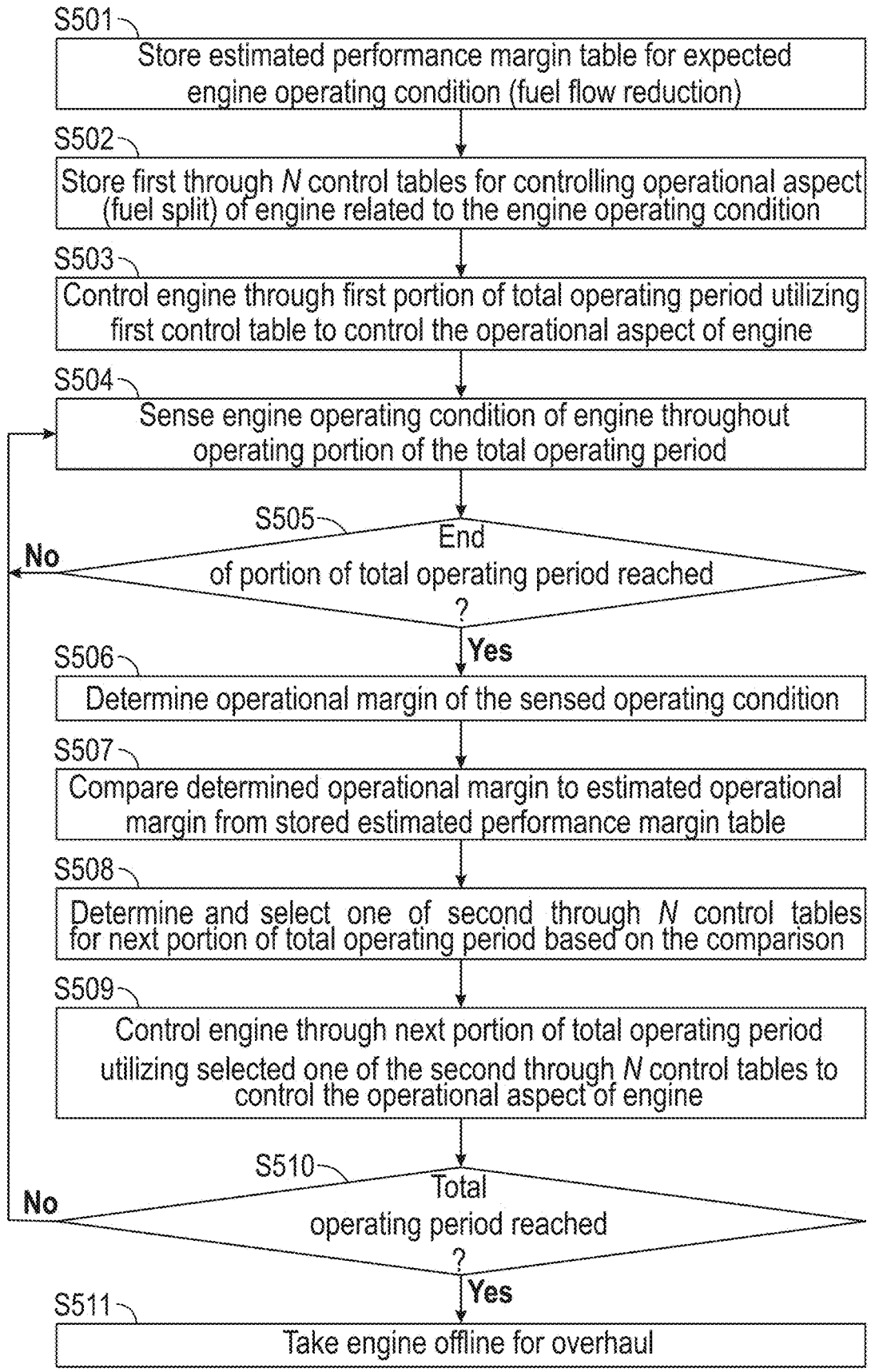

S501
Store estimated performance margin table for expected engine operating condition (fuel flow reduction)

S502
Store first through *N* control tables for controlling operational aspect (fuel split) of engine related to the engine operating condition S503
Control engine through first portion of total operating period utilizing first control table to control the operational aspect of engine S504
Sense engine operating condition of engine throughout operating portion of the total operating period S505
End of portion of total operating period reached ?

No

Yes

S506
Determine operational margin of the sensed operating condition

S507
Compare determined operational margin to estimated operational margin from stored estimated performance margin table S508
Determine and select one of second through *N* control tables for next portion of total operating period based on the comparison S509
Control engine through next portion of total operating period utilizing selected one of the second through *N* control tables to control the operational aspect of engine S510
Total operating period reached ?

No

Yes

S511
Take engine offline for overhaul

FIG. 5

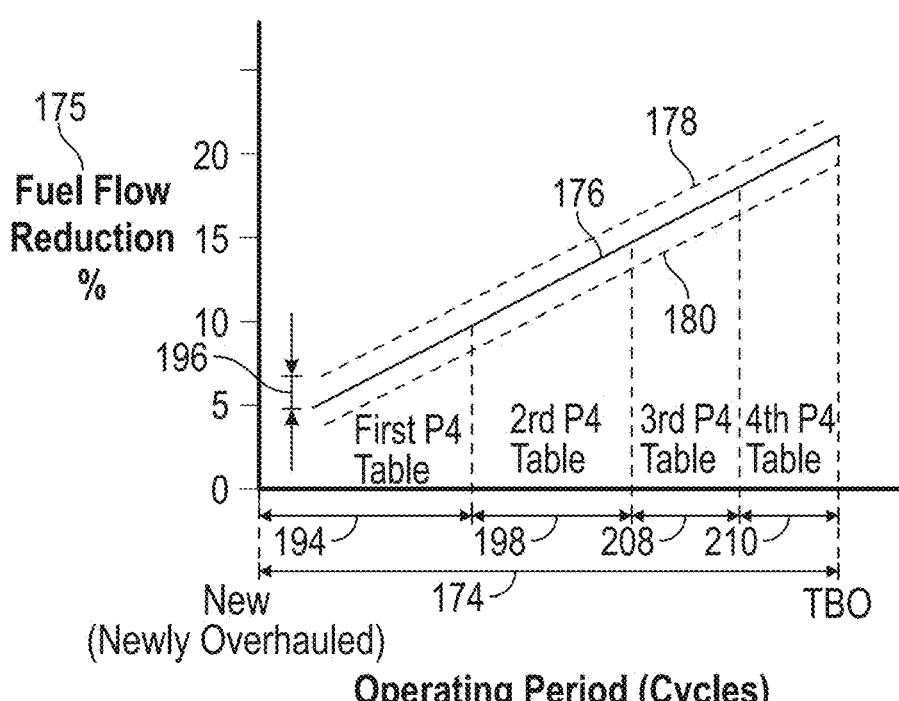
FIG. 6
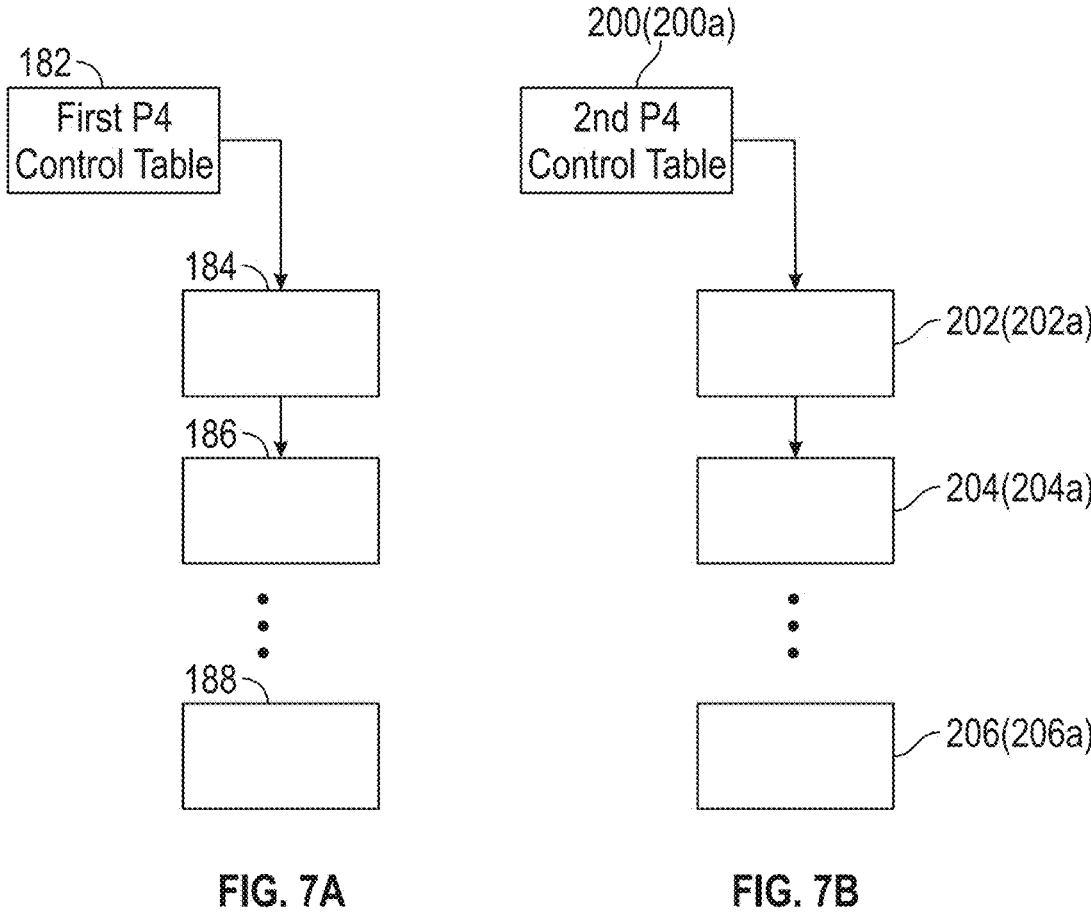
FIG. 7A          FIG. 7B

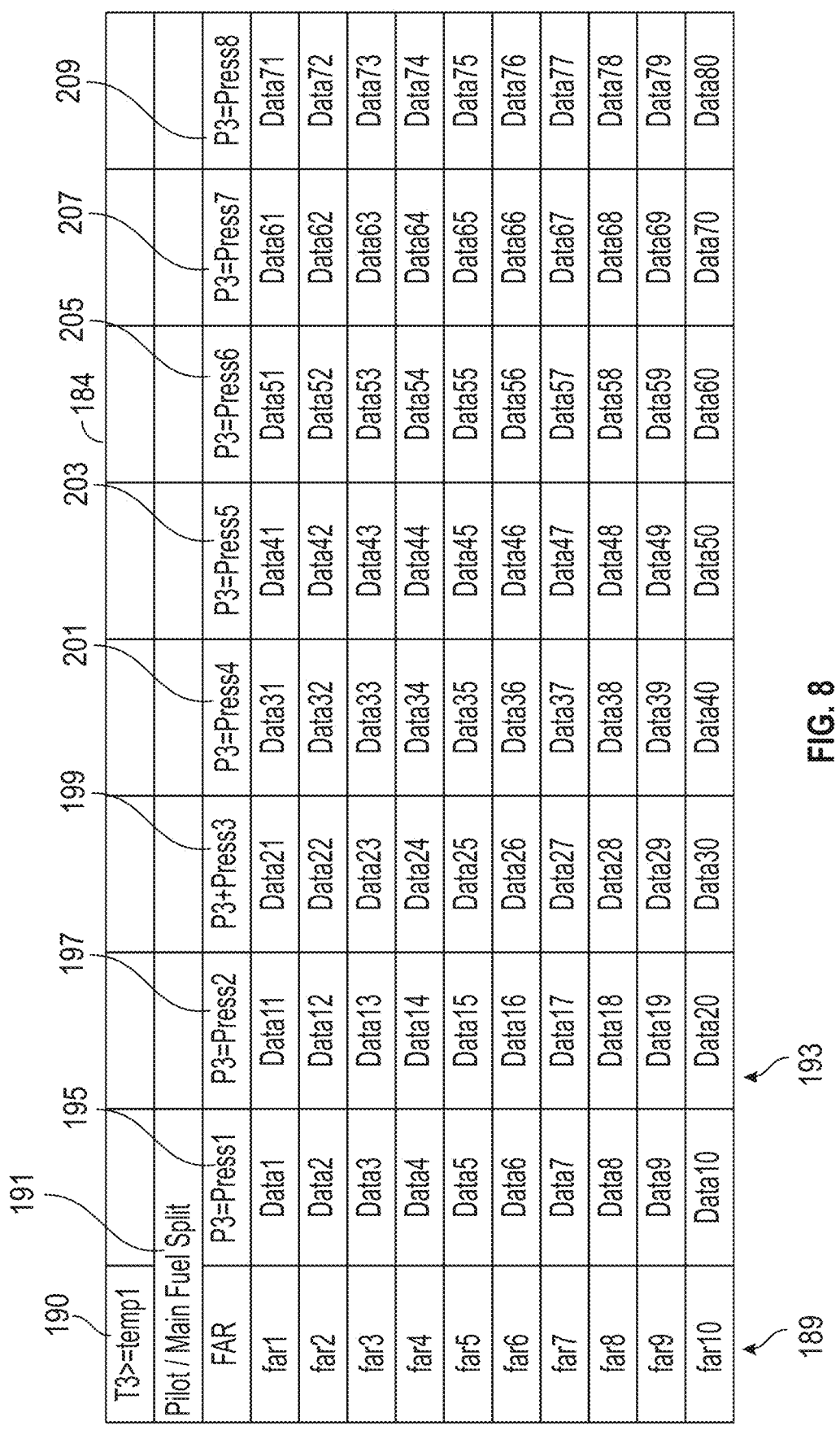

| T3>=temp1 | | | | | | | | |
|---|---|---|---|---|---|---|---|---|
| Pilot / Main Fuel Split | | | | | | | | |
| FAR | P3=Press1 | P3=Press2 | P3+Press3 | P3=Press4 | P3=Press5 | P3=Press6 | P3=Press7 | P3=Press8 |
| far1 | Data1 | Data11 | Data21 | Data31 | Data41 | Data51 | Data61 | Data71 |
| far2 | Data2 | Data12 | Data22 | Data32 | Data42 | Data52 | Data62 | Data72 |
| far3 | Data3 | Data13 | Data23 | Data33 | Data43 | Data53 | Data63 | Data73 |
| far4 | Data4 | Data14 | Data24 | Data34 | Data44 | Data54 | Data64 | Data74 |
| far5 | Data5 | Data15 | Data25 | Data35 | Data45 | Data55 | Data65 | Data75 |
| far6 | Data6 | Data16 | Data26 | Data36 | Data46 | Data56 | Data66 | Data76 |
| far7 | Data7 | Data17 | Data27 | Data37 | Data47 | Data57 | Data67 | Data77 |
| far8 | Data8 | Data18 | Data28 | Data38 | Data48 | Data58 | Data68 | Data78 |
| far9 | Data9 | Data19 | Data29 | Data39 | Data49 | Data59 | Data69 | Data79 |
| far10 | Data10 | Data20 | Data30 | Data40 | Data50 | Data60 | Data70 | Data80 |

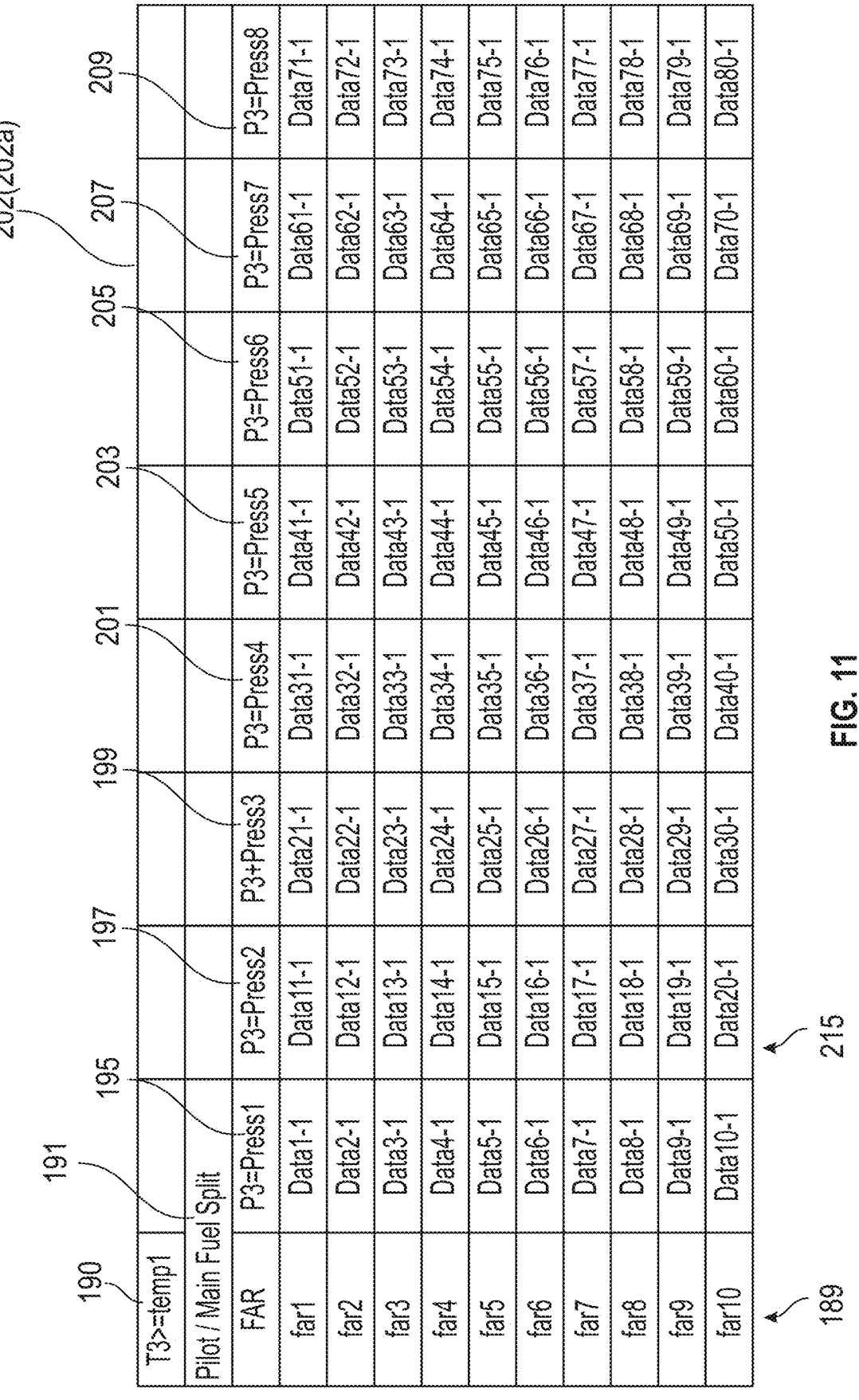

| T3>=temp1 Pilot / Main Fuel Split | | | | | | | | |
|---|---|---|---|---|---|---|---|---|
| FAR | P3=Press1 | P3=Press2 | P3+Press3 | P3=Press4 | P3=Press5 | P3=Press6 | P3=Press7 | P3=Press8 |
| far1 | Data1-1 | Data11-1 | Data21-1 | Data31-1 | Data41-1 | Data51-1 | Data61-1 | Data71-1 |
| far2 | Data2-1 | Data12-1 | Data22-1 | Data32-1 | Data42-1 | Data52-1 | Data62-1 | Data72-1 |
| far3 | Data3-1 | Data13-1 | Data23-1 | Data33-1 | Data43-1 | Data53-1 | Data63-1 | Data73-1 |
| far4 | Data4-1 | Data14-1 | Data24-1 | Data34-1 | Data44-1 | Data54-1 | Data64-1 | Data74-1 |
| far5 | Data5-1 | Data15-1 | Data25-1 | Data35-1 | Data45-1 | Data55-1 | Data65-1 | Data75-1 |
| far6 | Data6-1 | Data16-1 | Data26-1 | Data36-1 | Data46-1 | Data56-1 | Data66-1 | Data76-1 |
| far7 | Data7-1 | Data17-1 | Data27-1 | Data37-1 | Data47-1 | Data57-1 | Data67-1 | Data77-1 |
| far8 | Data8-1 | Data18-1 | Data28-1 | Data38-1 | Data48-1 | Data58-1 | Data68-1 | Data78-1 |
| far9 | Data9-1 | Data19-1 | Data29-1 | Data39-1 | Data49-1 | Data59-1 | Data69-1 | Data79-1 |
| far10 | Data10-1 | Data20-1 | Data30-1 | Data40-1 | Data50-1 | Data60-1 | Data70-1 | Data80-1 |

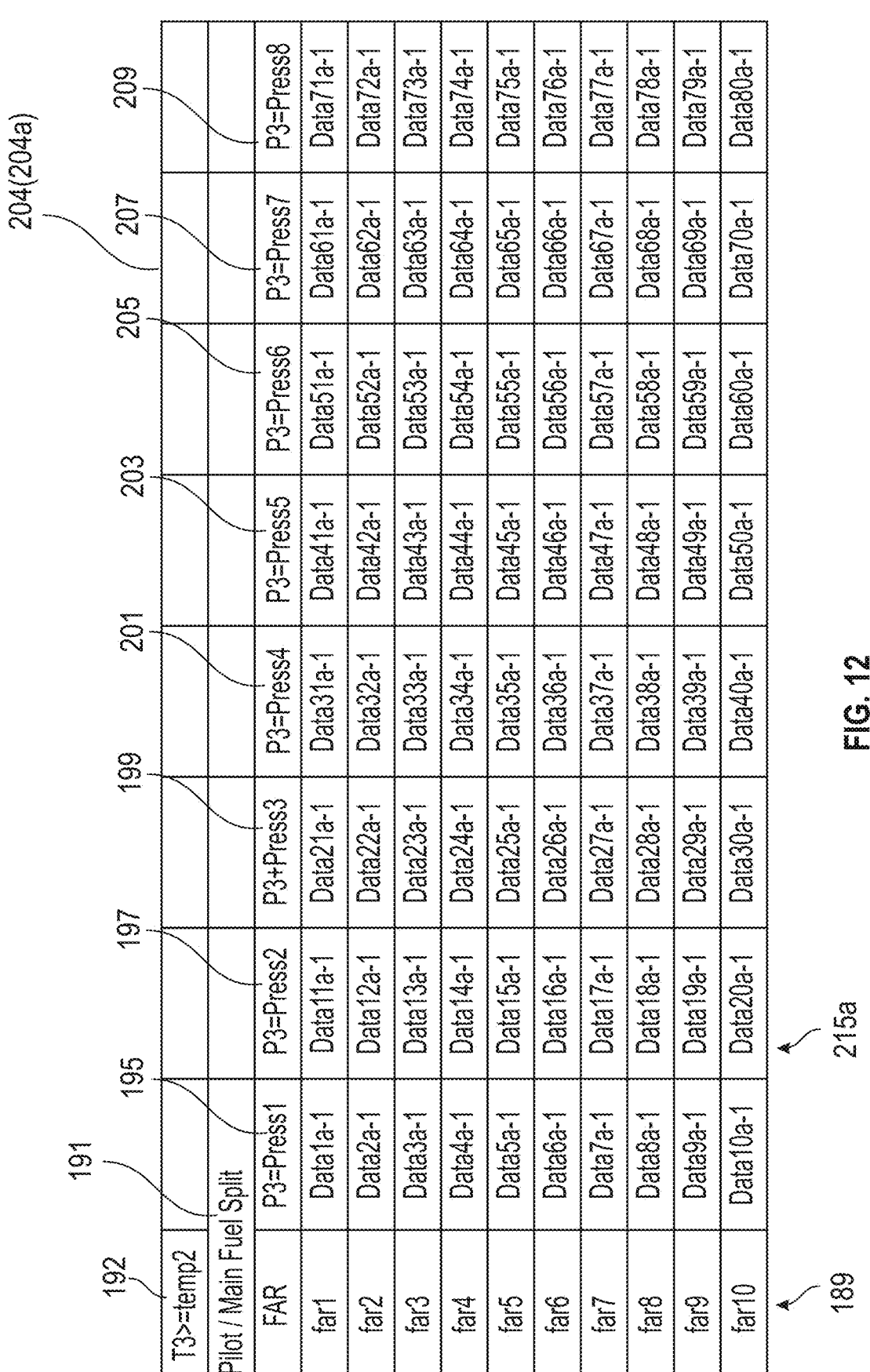

| T3>=temp2 Pilot / Main Fuel Split | | | | | | | | |
|---|---|---|---|---|---|---|---|---|
| FAR | P3=Press1 | P3=Press2 | P3+Press3 | P3=Press4 | P3=Press5 | P3=Press6 | P3=Press7 | P3=Press8 |
| far1 | Data1a-1 | Data11a-1 | Data21a-1 | Data31a-1 | Data41a-1 | Data51a-1 | Data61a-1 | Data71a-1 |
| far2 | Data2a-1 | Data12a-1 | Data22a-1 | Data32a-1 | Data42a-1 | Data52a-1 | Data62a-1 | Data72a-1 |
| far3 | Data3a-1 | Data13a-1 | Data23a-1 | Data33a-1 | Data43a-1 | Data53a-1 | Data63a-1 | Data73a-1 |
| far4 | Data4a-1 | Data14a-1 | Data24a-1 | Data34a-1 | Data44a-1 | Data54a-1 | Data64a-1 | Data74a-1 |
| far5 | Data5a-1 | Data15a-1 | Data25a-1 | Data35a-1 | Data45a-1 | Data55a-1 | Data65a-1 | Data75a-1 |
| far6 | Data6a-1 | Data16a-1 | Data26a-1 | Data36a-1 | Data46a-1 | Data56a-1 | Data66a-1 | Data76a-1 |
| far7 | Data7a-1 | Data17a-1 | Data27a-1 | Data37a-1 | Data47a-1 | Data57a-1 | Data67a-1 | Data77a-1 |
| far8 | Data8a-1 | Data18a-1 | Data28a-1 | Data38a-1 | Data48a-1 | Data58a-1 | Data68a-1 | Data78a-1 |
| far9 | Data9a-1 | Data19a-1 | Data29a-1 | Data39a-1 | Data49a-1 | Data59a-1 | Data69a-1 | Data79a-1 |
| far10 | Data10a-1 | Data20a-1 | Data30a-1 | Data40a-1 | Data50a-1 | Data60a-1 | Data70a-1 | Data80a-1 |

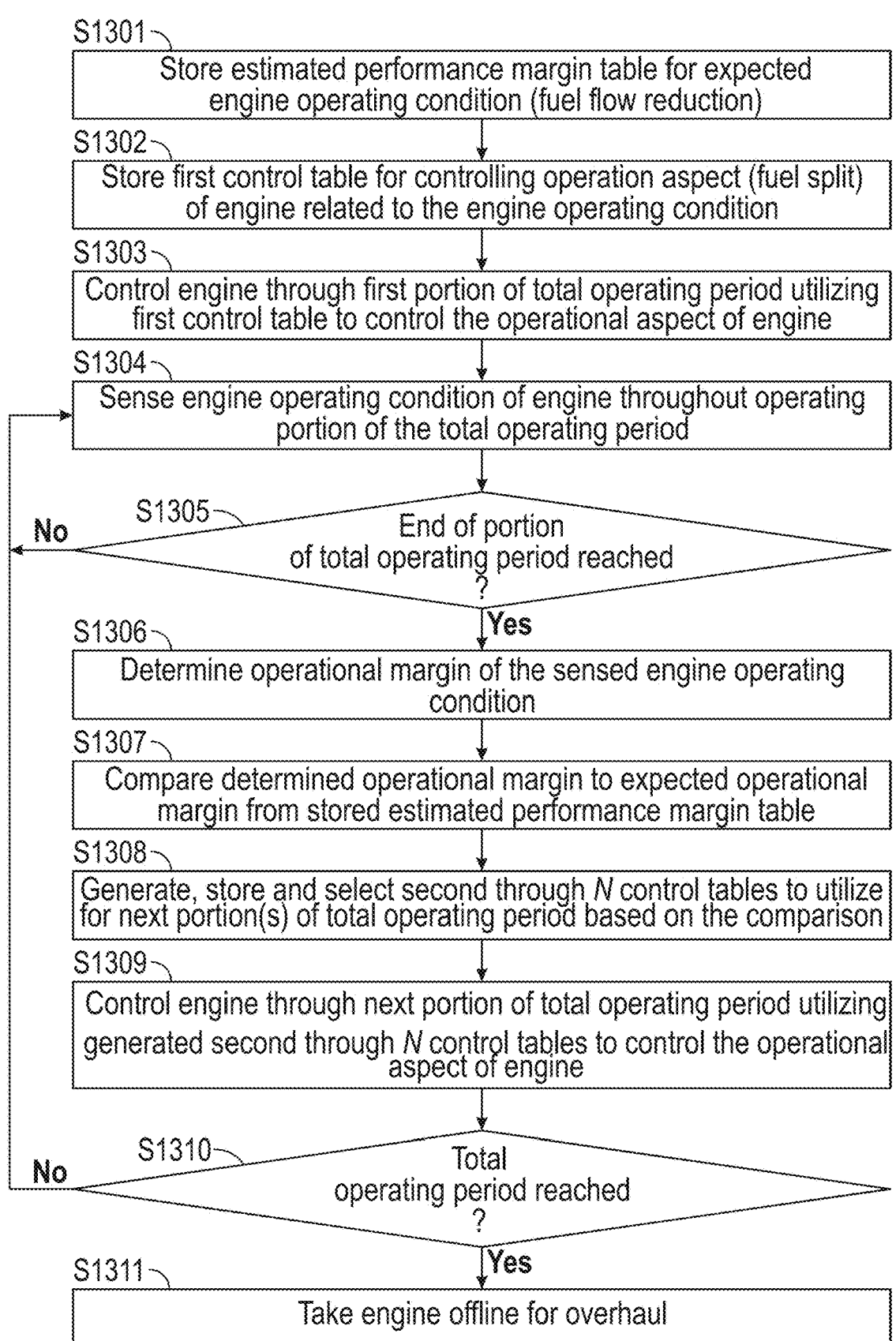

S1301
Store estimated performance margin table for expected engine operating condition (fuel flow reduction)

S1302
Store first control table for controlling operation aspect (fuel split) of engine related to the engine operating condition S1303
Control engine through first portion of total operating period utilizing first control table to control the operational aspect of engine S1304
Sense engine operating condition of engine throughout operating portion of the total operating period S1305
End of portion of total operating period reached ?

No

Yes

S1306
Determine operational margin of the sensed engine operating condition

S1307
Compare determined operational margin to expected operational margin from stored estimated performance margin table S1308
Generate, store and select second through *N* control tables to utilize for next portion(s) of total operating period based on the comparison S1309
Control engine through next portion of total operating period utilizing generated second through *N* control tables to control the operational aspect of engine S1310
Total operating period reached ?

No

Yes

S1311
Take engine offline for overhaul

FIG. 13

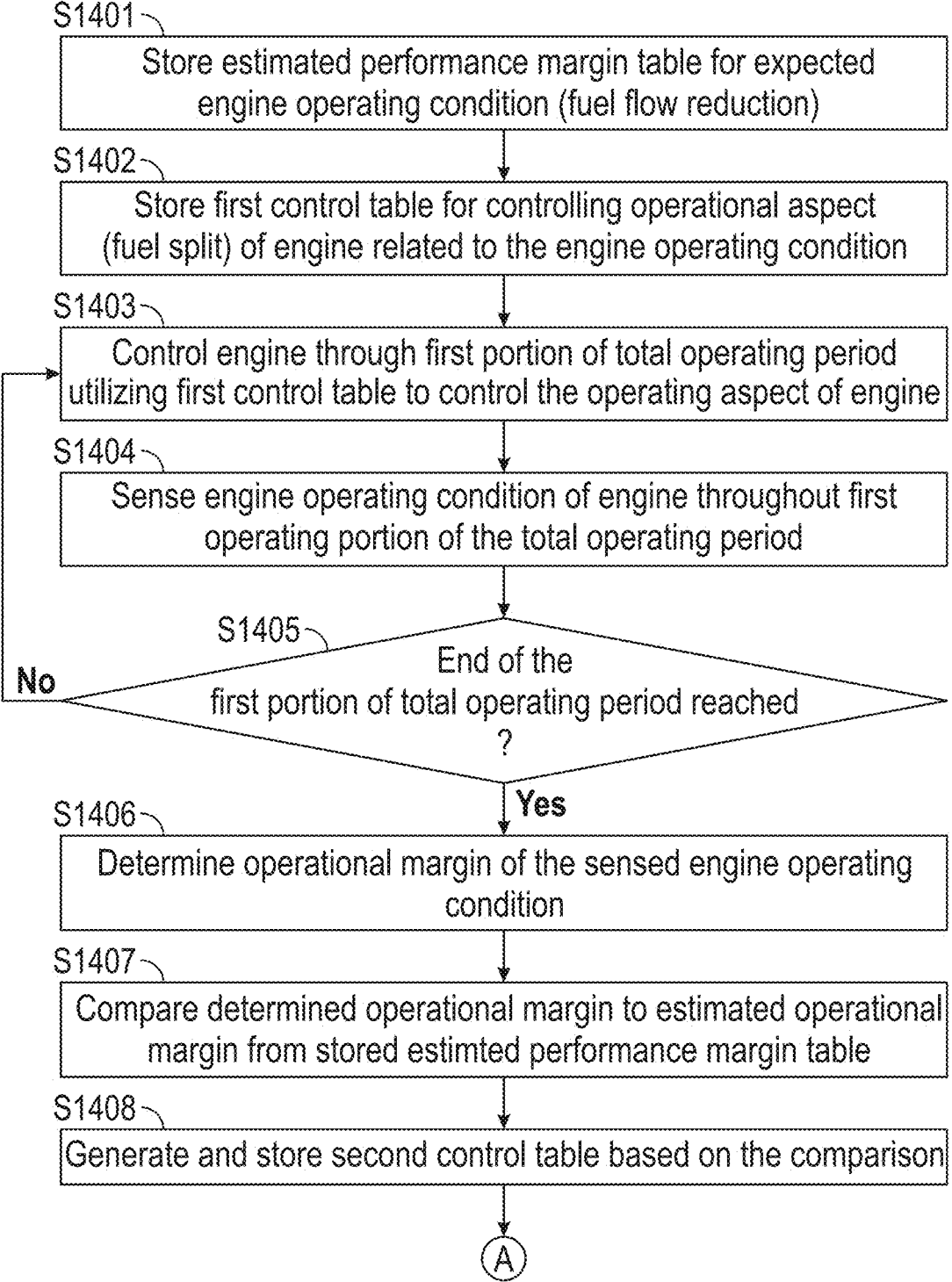

S1401
Store estimated performance margin table for expected engine operating condition (fuel flow reduction)

S1402
Store first control table for controlling operational aspect (fuel split) of engine related to the engine operating condition S1403
Control engine through first portion of total operating period utilizing first control table to control the operating aspect of engine S1404
Sense engine operating condition of engine throughout first operating portion of the total operating period S1405
End of the first portion of total operating period reached ?

No

Yes

S1406
Determine operational margin of the sensed engine operating condition

S1407
Compare determined operational margin to estimated operational margin from stored estimted performance margin table S1408
Generate and store second control table based on the comparison

METHOD OF OPERATING A GAS TURBINE ENGINE

TECHNICAL FIELD

The present disclosure relates to a method of operating a gas turbine engine.

BACKGROUND

Some conventional gas turbine engines are known to include a twin annular premixing swirler (TAPS) fuel nozzle/swirler assembly. The TAPS fuel nozzle/swirler assembly generally includes a pilot mixer portion and a main mixer portion arranged annularly about the pilot mixer portion. The pilot mixer portion includes a pilot fuel injector and the main mixer portion includes a main fuel injector. A flow of fuel is provided to both the pilot fuel injector and to the main fuel injector, and a split of the fuel flow between the flow to the pilot fuel injection and the flow to the main fuel injector is controlled during operation of the gas turbine engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 5 is a flowchart of process steps of a method of controlling the gas turbine engine of FIG. 1, according to an aspect of the present disclosure.

FIG. 6 depicts an example plot (graph) of a fuel flow reduction amount (vertical axis) over an operating period (horizontal axis) of the engine, according to an aspect of the present disclosure.

FIG. 7A depicts a table structure for a first control table, according to an aspect of the present disclosure.

FIG. 7B depicts a table structure for a second control table, according to an aspect of the present disclosure.

FIG. 8 depicts an example of a sub-table for the first control table that may be stored in a control table database, according to an aspect of the present disclosure.

FIG. 11 depict an example of a sub-table for a second control table that may be stored in the control table database, according to an aspect of the present disclosure.

FIG. 12 depicts an example of another sub-table for the second control table that may be stored in the control table database, according to an aspect of the present disclosure.

FIG. 13 is a flowchart of process steps of an alternate method of controlling the gas turbine engine of FIG. 1, according to an aspect of the present disclosure.

FIG. 14A and FIG. 14B combined depict a flowchart of process steps of an alternate method of controlling the gas turbine engine of FIG. 1, according to an aspect of the present disclosure.

DETAILED DESCRIPTION

Figure 1:
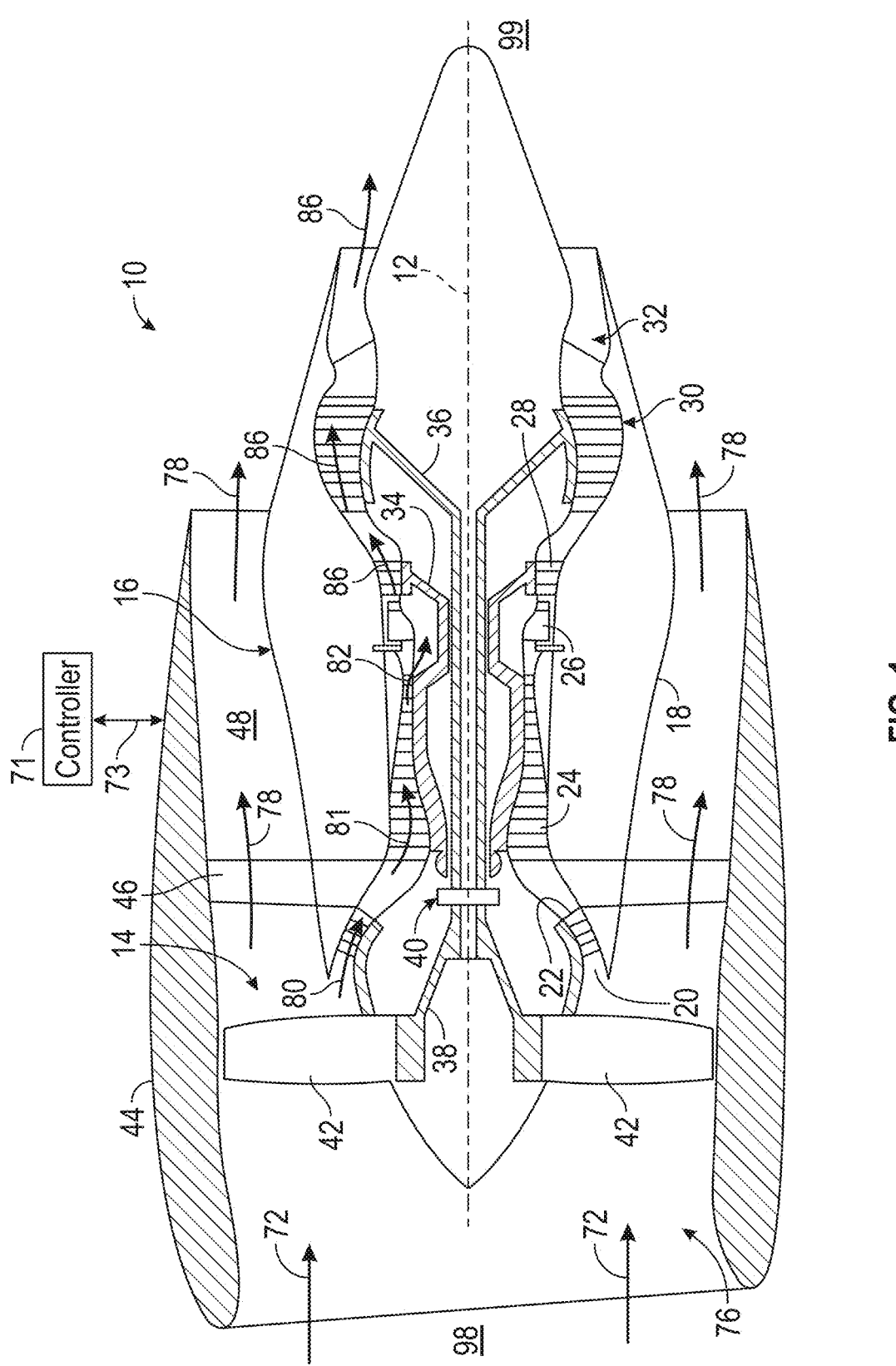
FIG. 1 is a schematic cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the disclosure as claimed.

Various embodiments are discussed in detail below. While specific embodiments are discussed, this is done for illustration purposes only. A person skilled in the relevant art will recognize that other components and configurations may be used without departing from the present disclosure.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to a relative side of an element and may be used interchangeably with the terms "upstream" and "downstream," respectively.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Some conventional gas turbine engines are known to include a twin annular premixing swirler (TAPS) fuel nozzle/swirler assembly. The TAPS fuel nozzle/swirler assembly generally includes a pilot mixer portion and a main mixer portion arranged annularly about the pilot mixer portion. The pilot mixer portion includes a pilot fuel injector and the main mixer portion includes a main fuel injector. A flow of fuel is provided to both the pilot fuel injector and to the main fuel injector, and a split of the fuel flow between the flow to the pilot fuel injection and the flow to the main fuel injector is controlled during operation of the gas turbine engine. Generally, an engine controller controls the fuel flow split between the pilot fuel injector and the main fuel injector. Over time, the engine performance is known to degrade, and to accommodate the degradation, a single control table for adjusting the fuel flow split may be provided within the engine controller to adjust the fuel flow spit based on a margin of degradation compared to a new engine margin. The single control table is generally prepared in advance based on known test data or based on known operation data for a particular model of engine. The single table is generally prepared with sufficient margin to allow for full deterioration. This margin can be large, however, and can significantly impact the engine performance and emissions.

The present disclosure addresses the foregoing by implementing multiple control tables within the engine controller. According to the present disclosure, when the engine is new, a first predefined control table is used to control operation of the engine through a first portion of an operational period (e.g., a time before overhaul). During the first portion of the operational period, operating conditions of the engine are monitored (i.e., sensed) and the operational margin is compared with the new margin. Based on the comparison, one of additional tables stored in the engine controller is used to operate the engine, thereby retaining operation closer to the observed operational margin. In one aspect, the additional tables are predefined and stored in the engine controller in advance. In another aspect, logic in the engine controller generates the additional tables based on the sensed operational data, and the generated additional tables are used to operate the engine. As a result, the engine can be operated more efficiently, and can better meet emissions requirements.

Referring now to the drawings, FIG. 1 is a schematic cross-sectional side view of an exemplary high by-pass turbofan jet engine 10, herein referred to as "engine 10," as may incorporate various embodiments of the present disclosure. Although further described below with reference to a ducted turbofan engine, the present disclosure is also applicable to turbomachinery in general, including turbojet, turboprop, and turboshaft gas turbine engines, including marine and industrial turbine engines and auxiliary power units. In addition, the present disclosure is not limited to ducted fan type turbine engines such as that shown in FIG. 1, but can be implemented in unducted fan (UDF) type turbine engines that may include a twin annular pre-mixing swirler (TAPS) combustor. As shown in FIG. 1, engine 10 has a longitudinal centerline axis 12 that extends therethrough from an upstream end 98 of the engine 10 to a downstream end 99 of the engine 10 for reference purposes. In general, engine 10 may include a fan assembly 14 and a turbo-engine 16 disposed downstream from the fan assembly 14.

The turbo-engine 16 may generally include an outer casing 18 that defines an annular inlet 20 to the turbo-engine 16. The outer casing 18 encases, or at least partially forms, in serial flow relationship, a compressor section that includes a booster or a low-pressure compressor (LPC) 22 and a high-pressure compressor (HPC) 24, a combustor 26, a turbine section that includes a high-pressure turbine (HPT) 28 and a low-pressure turbine (LPT) 30, and a jet exhaust nozzle 32. A high-pressure rotor shaft 34 drivingly connects the HPT 28 to the HPC 24. A low-pressure rotor shaft 36 drivingly connects the LPT 30 to the LPC 22. The low-pressure rotor shaft 36 may also be connected to a fan shaft 38 of the fan assembly 14. In particular embodiments, as shown in FIG. 1, the low-pressure rotor shaft 36 may be connected to the fan shaft 38 by way of a reduction gearbox assembly 40, such as in an indirect-drive or a geared-drive configuration. In other embodiments, although not illustrated, the engine 10 may further include an intermediate-pressure compressor and an intermediate-pressure turbine rotatable with an intermediate-pressure shaft that connects the intermediate-pressure turbine and the intermediate-pressure compressor.

As shown in FIG. 1, the fan assembly 14 includes a plurality of fan blades 42 that are coupled to and extend radially outwardly from the fan shaft 38. An annular fan casing or a nacelle 44 circumferentially surrounds the fan assembly 14 and/or at least a portion of the turbo-engine 16. The nacelle 44 may be supported relative to the turbo-engine 16 by a plurality of circumferentially spaced outlet guide vanes or struts 46. Moreover, at least a portion of the nacelle 44 may extend over an outer portion of the turbo-engine 16 so as to define a bypass airflow passage 48 between the nacelle 44 and the outer casing 18.

An engine controller 71 communicates with various components of the engine 10 via a communication channel 73. The engine controller 71 will be described in more detail below, but, briefly, the engine controller 71 controls operation of the engine 10 via control signals transmitted to the various components of the engine 10 via the communication channel 73, and by receiving signals from the various components of the engine 10 via the communication channel 73. The engine controller 71 may be provided within the engine 10, or within a structure to which the engine 10 is mounted (e.g., an aircraft).

Figure 2:
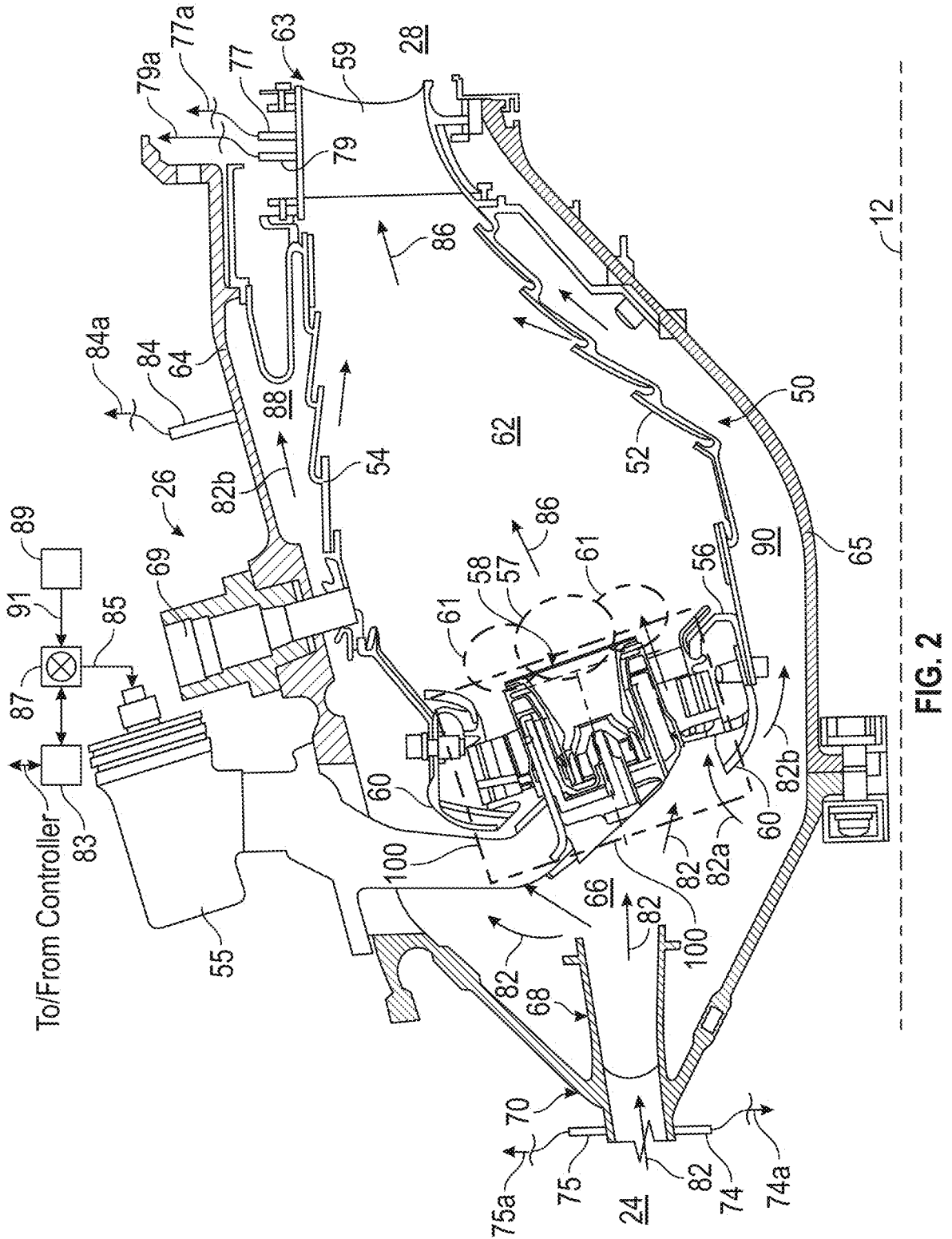
FIG. 2 is a partial cross-sectional side view of an exemplary combustor, according to an aspect of the present disclosure.

FIG. 2 is a partial cross-sectional side view of the exemplary combustor 26 of the turbo-engine 16 as shown in FIG. 1. FIG. 2 depicts an example of a twin annular pre-mixing swirler (TAPS) type combustor, and is generally an annular combustor that extends circumferentially about the longitudinal centerline axis 12. The combustor 26 includes a cowl 60, and a combustor liner 50, having an inner liner 52 and an outer liner 54. Each of the inner liner 52 and the outer liner 54 is an annular liner that extends circumferentially about the longitudinal centerline axis 12. A dome 56 extends between the inner liner 52 and the outer liner 54. The inner liner 52, the outer liner 54, and the dome 56 together define a combustion chamber 62.

The combustor 26 further includes an outer casing 64 that extends circumferentially about the longitudinal centerline axis 12, and an inner casing 65 that also extends circumferentially about the longitudinal centerline axis 12. An outer flow passage 88 is defined between the outer casing 64 and the outer liner 54, and an inner flow passage 90 is defined between the inner casing 65 and the inner liner 52. The outer casing 64 and the inner casing 65 converge at an upstream end 70 of the combustor 26, and, together, define a pressure plenum 66. The outer casing 64 and the inner casing 65 are also connected with a diffuser 68. The diffuser 68 is in flow communication with the HPC 24 to receive a flow of compressed air 82 from the HPC 24 and to provide the flow of the compressed air 82 into the pressure plenum 66.

A fuel nozzle assembly 55 is connected to the outer casing 64 and receives a flow of fuel via a fuel line 85 connected to the fuel nozzle assembly 55. While one fuel line 85 is shown in FIG. 2 connected to the fuel nozzle assembly 55, the fuel line 85 may include multiple separate fuel lines (e.g., a pilot fuel line portion and a main fuel line portion) so as to provide separate fuel flows (e.g., a pilot fuel flow and a main fuel flow) to the fuel nozzle assembly 55. The fuel nozzle assembly 55 includes a fuel nozzle/swirler assembly 58, which is described in more detail below. The fuel line 85 is connected with an actuator or a fuel valve 87, and the fuel valve 87 is connected to a fuel tank 89 via a fuel line 91 to receive a flow of fuel from the fuel tank 89. A fuel flow controller 83 receives signals from the engine controller 71 (FIG. 1) and controls the fuel valve 87 to control the flow of the fuel to the fuel nozzle assembly 55. While the fuel flow controller 83 is shown as being separate from the engine controller 71 in FIG. 2, the fuel flow controller 83 may be incorporated within the engine controller 71. The fuel flow controller 83 may also include various regulators (not shown) that regulate the flow of fuel, based, at least in part, on feedback from various sensors within the combustor 26.

An ignitor 69 is connected to the outer casing 64, and extends through the outer flow passage 88 and through the outer liner 54. The ignitor 69 provides an ignition source (e.g., a spark) to ignite a pilot fuel-air mixture 57. A main fuel-air mixture 61 may be ignited via the ignited pilot fuel-air mixture 57, or the ignitor 69 may also be used to ignite the main fuel-air mixture 61.

In the combustion chamber 62, an initial chemical reaction of the ignited pilot fuel-air mixture 57 injected into the combustion chamber 62 by a pilot swirler portion (to be described below) of the fuel nozzle/swirler assembly 58 may occur to generate combustion gases 86. In higher power operations of the combustor 26, the main fuel-air mixture 61 is injected into the combustion chamber 62 by a main swirler portion (to be described below) of the fuel nozzle/swirler assembly 58 to generate combustion gases 86. The combustion gases 86 then flow further downstream into the HPT 28 and the LPT 30 (FIG. 1) via a turbine nozzle 59 at a downstream end 63 of the combustion chamber 62.

The combustor 26 also includes various sensors that provide feedback data to the engine controller 71, and may also provide feedback data to the fuel flow controller 83. For example, the combustor 26 may include a T3 temperature sensor 74 that provides T3 temperature feedback data 74a and a P3 pressure sensor 75 that provides P3 pressure feedback data 75a of the compressor outlet/combustor inlet temperature (T3) and the compressor outlet pressure (P3) to the engine controller 71 and to the regulators. The combustor 26 may also include a T4 temperature sensor 77 that provides T4 temperature feedback data 77a and a P4 pressure sensor 79 that provides P4 pressure feedback data 79a of the combustor outlet temperature (T4) and the combustor outlet pressure (P4) to the engine controller 71. The combustor 26 may further include, for example, a combustor vibration sensor 84 that provides acoustic vibration feedback data 84a to the engine controller 71. As will explained below, the engine controller 71 utilizes the feedback data from the combustor 26 to control various operating aspects of the engine 10.

Referring back to FIG. 1, in operation of the engine 10, a volume of inlet air 72 enters the nacelle 44 at a nacelle inlet 76, and the inlet air 72 is propelled through the fan assembly 14. A portion of the inlet air 72 propelled by the fan assembly 14 enters the LPC 22 at the annular inlet 20 as a compressor inlet airflow 80, where the compressor inlet airflow 80 is compressed by the LPC 22 to generate compressed air 81. The compressed air 81 then flows to the HPC 24, where the compressed air 81 is further compressed to generate compressed air 82. The compressed air 82 from the HPC 24 enters the combustor 26 via the diffuser 68 (FIG. 2). Another portion of the inlet air 72 propelled by the fan assembly 14 flows through the bypass airflow passage 48, thereby providing a bypass airflow 78. The bypass airflow 78 provides a majority of the thrust for the engine 10.

Referring back to FIG. 2, as discussed above, the compressed air 82 flows through the diffuser 68, which provides for a reduction in velocity of the compressed air 82 entering the pressure plenum 66, and increases the pressure of the compressed air 82 within the pressure plenum 66. A portion of the compressed air 82 in the pressure plenum 66 enters the cowl 60 (shown schematically as compressed air 82a), while another portion of the compressed air 82 passes to the outer flow passage 88 and to the inner flow passage 90 (shown schematically as compressed air 82b). The compressed air

82a passes through the fuel nozzle/swirler assembly 58 to mix with a pilot fuel flow to generate the pilot fuel-air mixture 57, and to mix with a main fuel flow to generate the main fuel-air mixture 61, both of which are then ignited to generate the combustion gases 86. The compressed air 82b in the outer flow passage 88 and in the inner flow passage 90 may be used for various purposes, such as dilution air (not shown) provided to the combustion chamber 62 through dilution openings (not shown) in the inner liner 52 and the outer liner 54, for cooling of the inner liner 52 and the outer liner 54, or for cooling other components of the engine 10.

Referring back to FIG. 1, the combustion gases 86 flow from the combustor 26 to the HPT 28, where work is extracted from the combustion gases 86 to rotate the HPT 28. The rotation of the HPT 28 supports rotation of the HPC 24 via the high-pressure rotor shaft 34. The combustion gases 86 then continue to flow downstream of the HPT 28 to the LPT 30, where additional work is extracted from the combustion gases 86 to rotate the LPT 30. The rotation of the LPT 30 supports rotation of the LPC 22 via the low-pressure rotor shaft 36, and also supports rotation of the fan assembly 14 via the fan shaft 38 connected to the reduction gearbox assembly 40. The remaining combustion gases 86 pass through the jet exhaust nozzle 32 and provide turbo-engine thrust.

Figure 3:
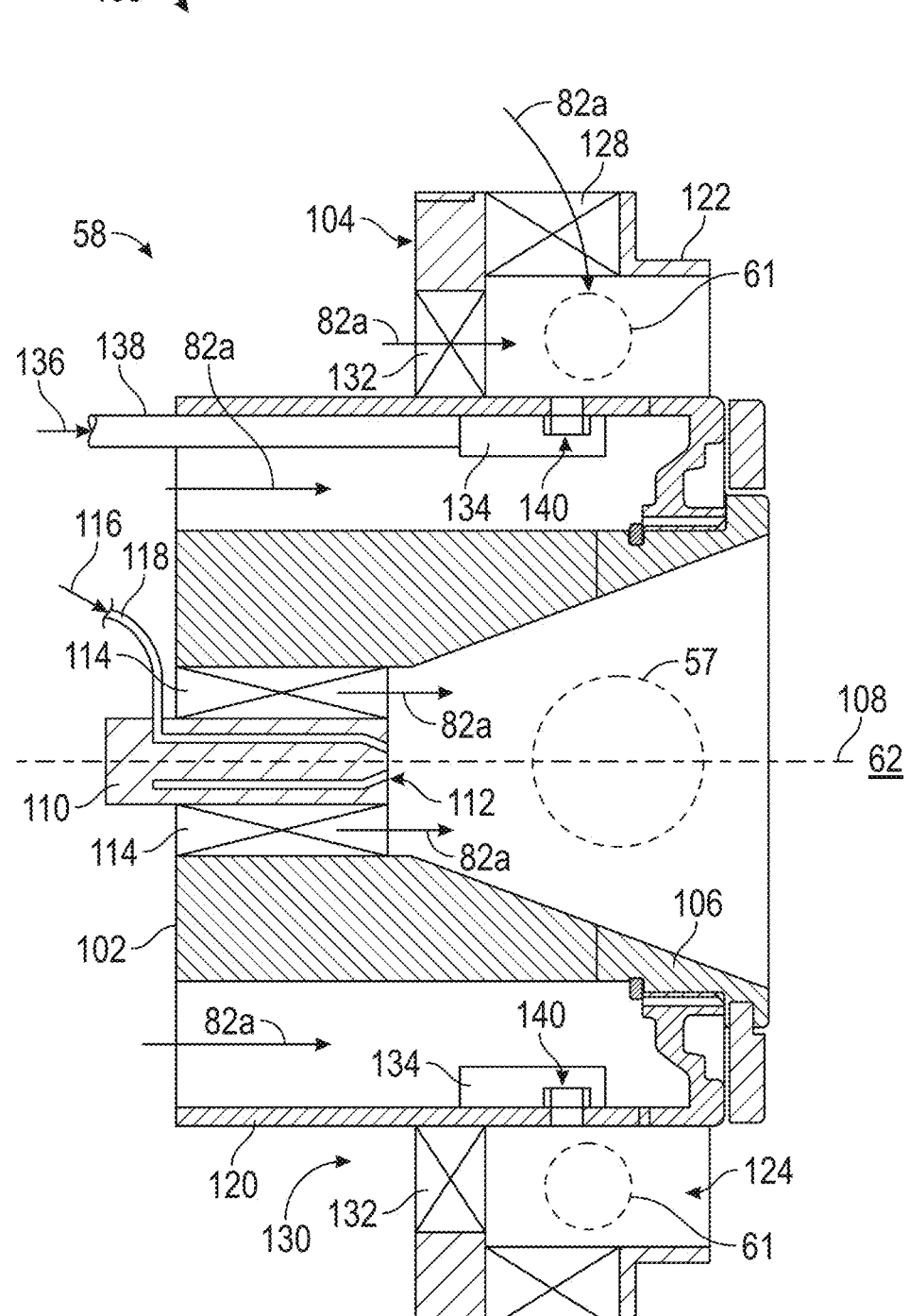
FIG. 3 is an enlarged partial cross-sectional view of a TAPS fuel nozzle/swirler assembly, taken at detail view 100 of FIG. 2, according to an aspect of the present disclosure.

FIG. 3 is an enlarged partial cross-sectional view of the fuel nozzle/swirler assembly 58, taken at detail view 100 of FIG. 2, according to an aspect of the present disclosure. The fuel nozzle/swirler assembly 58 may generally be a twin annular premixing swirler (TAPS) fuel nozzle assembly that includes a pilot mixer assembly 102 and a main mixer assembly 104. The pilot mixer assembly 102 includes a venturi 106 that extends circumferentially about a fuel nozzle centerline axis 108, and a pilot fuel injector 110 mounted within the venturi 106. Further, the pilot mixer assembly 102 includes a pilot swirler 112 that constitutes a plurality of pilot swirl vanes 114 arranged radially outward of the pilot fuel injector 110. The pilot swirler 112 is generally oriented parallel to the fuel nozzle centerline axis 108, and includes the plurality of pilot swirl vanes 114 for swirling the compressed air 82a traveling therethrough. A pilot fuel flow 116 is provided via a pilot fuel line 118 to the pilot fuel injector 110. The pilot fuel flow 116 and the compressed air 82a are generally provided to the pilot mixer assembly 102 at all times during the engine operating cycle. The pilot fuel flow 116 is controlled by the fuel flow controller 83 and the fuel valve 87 (FIG. 2).

The pilot fuel injector 110 may be any type of fuel injector, including an air blast type of fuel injector, where pre-filming and atomization of the pilot fuel flow 116 provided by the pilot fuel injector 110 are performed almost exclusively by directing the compressed air 82a at the pilot fuel flow 116. The pilot fuel flow 116 is provided by the pilot fuel line 118 that is connected with a pilot portion of the fuel line 85 (FIG. 2), which is in flow communication with the fuel valve 87, connected with the pilot fuel injector 110. The pilot fuel flow 116 is injected from the pilot fuel injector 110 into the venturi 106. The pilot fuel-air mixture 57 (FIG. 2) is then generated within the venturi 106 by mixing the swirling compressed air 82a passing through the plurality of pilot swirl vanes 114 and the pilot fuel flow 116 injected by the pilot fuel injector 110. The pilot fuel-air mixture 57 is then injected into the combustion chamber 62, where the pilot fuel-air mixture 57 is ignited by the ignitor 69 (FIG. 2) and burned to generate the combustion gases 86 (FIG. 2).

The main mixer assembly 104 is attached to a pilot fuel nozzle housing 120 that surrounds the pilot mixer assembly 102. The main mixer assembly 104 includes an annular main housing 122 radially surrounding the pilot fuel nozzle housing 120, where the main housing 122 defines an annular cavity 124. The main mixer assembly 104 includes a radial swirler 126 that is oriented substantially radially to the fuel nozzle centerline axis 108, and includes a plurality of radial swirl vanes 128 (shown generally) for swirling the compressed air 82a flowing therebetween. The plurality of radial swirl vanes 128 are substantially uniformly spaced circumferentially, and a plurality of substantially uniform passages are defined between adjacent radial swirl vanes 128. The main mixer assembly 104 may, but need not, also include an axial swirler 130 oriented substantially parallel to the fuel nozzle centerline axis 108. The axial swirler 130 further includes a plurality of axial swirl vanes 132 (shown generally) for swirling the compressed air 82a flowing therebetween. The plurality of axial swirl vanes 132 of the axial swirler 130 are substantially uniformly spaced circumferentially, thereby defining a plurality of substantially uniform passages therebetween.

A main fuel circuit 134 is located within the pilot fuel nozzle housing 120 between pilot mixer assembly 102 and main mixer assembly 104. The main fuel circuit 134 is provided with a main fuel flow 136 via a main fuel line 138. The main fuel line 138 is connected with the fuel line 85 (FIG. 2) to receive a main fuel flow from the fuel valve 87 (FIG. 2). As discussed above, the fuel line 85 may include a main fuel line portion to provide the main fuel flow 136 to the fuel nozzle assembly 55. A plurality of main fuel injectors 140 are provided at the main fuel circuit 134. The main fuel injectors 140 are arranged to inject the main fuel flow 136 into the annular cavity 124 of the main mixer assembly 104. The main fuel-air mixture 61 (FIG. 2) is generated within the annular cavity 124 by mixing of the compressed air 82a passing through the radial swirl vanes 128, and the compressed air 82a passing through the axial swirl vanes 132 with the main fuel flow 136 injected by the main fuel injectors 140 into the annular cavity 124. The main fuel-air mixture 61 then flows into the combustion chamber 62, where the main fuel-air mixture 61 is ignited and burned to generate the combustion gases 86. As will be described below, the engine controller 71 (FIG. 1) controls the pilot fuel flow 116 and the main fuel flow 136 to provide a desired pilot fuel split and a main fuel split based on various combustion factors of the combustor 26.

Figure 4:
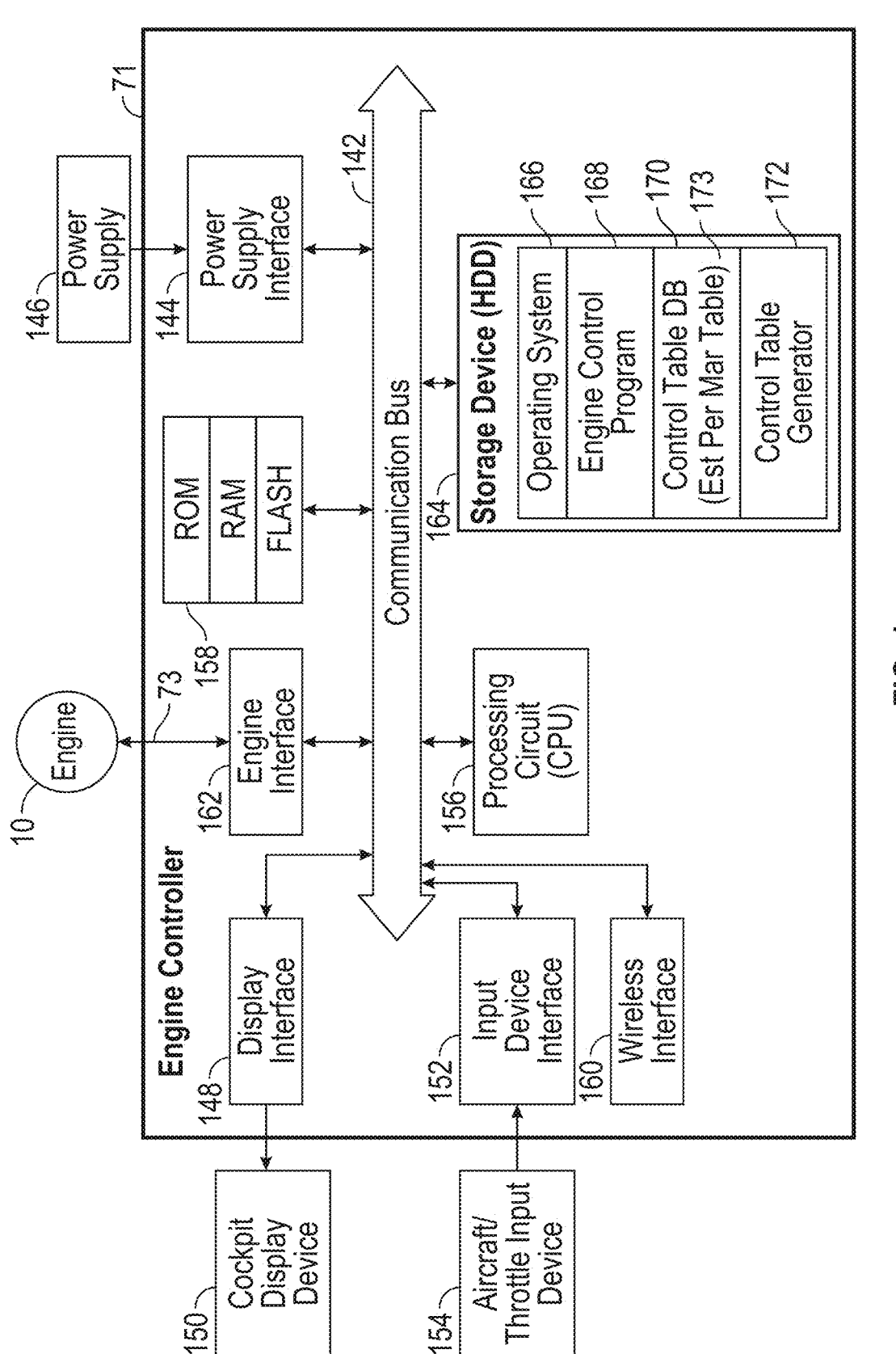
FIG. 4 is a block diagram of an exemplary engine controller for implementing a method of operating the gas turbine engine, according to an aspect of the present disclosure.

FIG. 4 is a block diagram of an exemplary engine controller 71 for implementing a method of operating the gas turbine engine 10, according to an aspect of the present disclosure. The engine controller 71 may be a full authority digital engine controller (FADEC) that includes various computing circuits or components, including a communication bus 142 that provides for transmitting signals between the various computing components. A power supply interface 144 interfaces with an external power supply 146 to provide power to the engine controller 71. The external power supply 146 may be, for example, a battery (not shown), a generator (not shown) attached to the engine 10, or any other power source that is included on a platform (e.g., an aircraft) to which the engine controller 71 is installed. A display interface 148 provides signals to a cockpit display device 150 to display various engine operating conditions, such as various temperature measurements, pressure measurements, speed measurements, etc. An input device interface 152 receives signals from various aircraft input devices, such as an aircraft/throttle input device 154. A processing circuit (e.g., a central processing unit or a CPU) 156 may be, for example, a microprocessor where data processing logic and control is included on a single integrated circuit (IC), or a small number of ICs. The microprocessor may contain arithmetic, logic, and control circuitry required to perform the functions of a computer's central processing unit.

The engine controller 71 also includes a memory 158, which may be, for example, any one or more of a read-only memory (ROM), a random-access memory (RAM), or a flash memory, to which the processing circuit 156 may read data therefrom, or may write data thereto, depending on the type of memory provided. While FIG. 4 depicts a single memory 158, multiple memories 158 may be included, and each of the multiple memories 158 can be a different type of memory. For example, a ROM is a type of non-volatile memory used in computers and other electronic devices in which data stored in the ROM cannot be electronically modified after the manufacture of the memory device. The ROM is useful for storing software that is rarely changed during the life of the system, such as firmware. The ROM may also be a floating-gate ROM semiconductor memory in the form of erasable programmable read-only memory (EPROM), electrically erasable programmable read-only memory (EEPROM) and flash memory that can be erased and re-programmed.

A RAM is a form of computer memory that can be read and changed in any order, and is typically used to store working data and machine code. A RAM device allows data items to be read or written in almost the same amount of time, irrespective of the physical location of data inside the memory, in contrast with other direct-access data storage media (such as hard disks), where the time required to read and to write data items varies significantly depending on their physical locations on the recording medium, due to mechanical limitations such as media rotation speeds and arm movement. The RAM contains multiplexing and demultiplexing circuitry, to connect the data lines to the addressed storage for reading or writing the entry. Usually, more than one bit of storage is accessed by the same address, and RAM devices often have multiple data lines and are said to be "8-bit" or "16-bit", etc. devices. The RAM may also be in the form of an integrated circuit (IC) chip with MOS (metal-oxide-semiconductor) memory cells. The RAM memory is normally associated with volatile types of memory where stored information is lost if power is removed. Two main types of volatile random-access semiconductor memory are static random-access memory (SRAM) and dynamic random-access memory (DRAM). Flash memory is an electronic non-volatile computer memory storage medium that can be electrically erased and reprogrammed.

The engine controller 71 may also include a wireless interface 160, which may be a WIFI adapter, or may be a Bluetooth ("Bluetooth" is a registered trademark of the Bluetooth SIG, Inc.) adapter. The wireless interface 160 may communicate wirelessly with various components on an aircraft to which the engine controller 71 is installed. Alternatively, the wireless interface 160 may communicate with ground support devices used to program the engine controller 71, or to retrieve data from the engine controller 71.

The engine controller 71 also includes an engine interface 162 that provides two-way communication between the engine controller 71 and the engine 10 via the communication channel 73 so that the engine controller 71 can transmit data to, and can receive data from the engine 10. For example, the engine controller 71 can receive sensor data from the engine 10, and can provide control signals to the engine 10, including providing signals to the fuel flow controller 83. Feedback signals from actuators or from the fuel valve 87, and from the regulators within the fuel flow controller 83 can also be provided to the engine controller 71 via the engine interface 162.

The engine controller 71 also includes a storage device (or a memory) 164, such as a hard disk drive, or the like. The storage device 164 can include various software programs or modules to be executed by the processing circuit 156. In this manner, the various programs stored in the storage device 164 and executed by the processing circuit 156 provide for the engine controller 71 being specially programmed to implement the engine control method of this disclosure, described in more detail below. The storage device 164 may store an operating system program 166 that may be any operating system program utilized in known FADEC controllers.

The storage device 164 may also store an engine control program 168 that can be executed by the processing circuit 156. The engine control program 168 works by receiving multiple input variables of the current flight conditions, including air density, throttle lever position, engine temperatures, engine pressures, and many other parameters. The input variables are received and analyzed up to seventy times per second. Engine operating parameters such as fuel flow, stator vane position, bleed valve position, and others are computed from this data and applied as appropriate. The engine control program 168 also controls engine starting and restarting. The basic purpose of the engine control program 168 is to provide optimum engine efficiency for a given flight condition, and the engine control program 168 not only provides for efficient engine operation, but also allows the manufacturer to program engine limitations and to receive engine health and maintenance reports. For example, to avoid exceeding a certain engine temperature, the engine control program 168 can be programmed to automatically take the necessary measures without pilot intervention.

In the present disclosure, the engine control program 168 is programmed to refer to various control tables (or look-up tables) stored in a control table database 170 of the storage device 164. As will be described in more detail below, the control tables stored in the control table database 170 may either be predefined and stored in the control table database 170, or may be generated by the engine control program 168 utilizing a control table generator 172 (e.g., a plug-in algorithm) and then stored in the control table database 170. As will be explained below, the control table generator 172 provides for the engine control program 168 to utilize various operating condition feedback data and tables stored in the control table database 170 to either update control data contained in existing stored control tables, or to generate new control tables for controlling various aspects of the engine 10.

FIG. 5 is a flowchart of process steps of a method of controlling the engine 10, according to an aspect of the present disclosure. The following description of FIG. 5 refers to various elements described above with regard to FIG. 2 through FIG. 4, and the following description below with regard to FIG. 6 through FIG. 12. The method of FIG. 5 is described with regard to controlling one operating aspect of the engine 10 (FIG. 4), and, more particularly, in controlling a pilot fuel split percentage and a main fuel split percentage for various fuel-to-air ratios and in relation to a fuel flow reduction (operating condition) in the combustor 26 (FIG. 2) over time. The method of FIG. 5, however, can also be implemented with regard to other operating aspects of the engine 10 and the method is not limited to the foregoing fuel flow split control. In step S501, an estimated performance margin table 173 (FIG. 4) for an expected engine operating condition is stored in, for example, the control table database 170 (FIG. 4). For example, the estimated performance margin table 173 may plot an expected (estimated) fuel flow reduction over a total operating period of the engine 10.

FIG. 6 depicts an example plot (graph) of a fuel flow reduction amount (vertical axis) over a total operating period (horizontal axis) of the engine 10 corresponding to the estimated performance margin table 173 (FIG. 4), according to an aspect of the present disclosure. In FIG. 6, an estimated performance margin 176 of an operating condition 175 (e.g., a fuel flow reduction percentage as the operating condition) is plotted over the total operating period 174 of the engine 10. The estimated performance margin table 173 (FIG. 4) contains data points corresponding to the plot of the estimated performance margin 176 (i.e., corresponding to the fuel flow reduction percentage amount over the total operating period 174) of FIG. 6 and is stored in the control table database 170 (FIG. 4). The data utilized in the estimated performance margin table 173 for the estimated performance margin 176 of the engine operating condition (the fuel flow reduction) may be based on historical data for the particular engine model, or may be based on test data or design data of the engine model type if the engine model type is a new engine model type for which little or no historical data exists. In FIG. 6, an operating period may be a measure of a number of cycles that the engine 10 has been operated. Here, one cycle generally refers to operating the engine 10 through a single flight of an aircraft from startup, takeoff, cruise, landing, and shutdown of the engine 10. Alternatively, rather than the operating period being based on a number of cycles, a running time (e.g., a specified number of hours of operation) of the engine 10 may be utilized instead as the operating period. In FIG. 6, the total operating period 174 of the engine 10 may be a period (e.g., a number of cycles) from when the engine 10 is new (or newly overhauled) to an expected time before overhaul (TBO). The total number of cycles from when the engine 10 is new (or newly overhauled) to the TBO is based on the model type of the engine 10, as well as the particular flight application for which the engine 10 is designed. For example, an engine 10 that is designed and operated in long-haul flights (e.g., on wide-body aircraft) may have a lower number of cycles (e.g., 17,500 cycles) between being new and the TBO as compared to a greater number of cycles (e.g., 30,000 cycles) for short-haul flight applications.

In FIG. 6, the fuel flow reduction may be measured as a percentage of a reduced flow of the fuel to the combustor 26 (FIG. 2). As was described above, the fuel flow is controlled by the fuel flow controller 83 (FIG. 2), which may include various regulators, and that receives feedback from various sensors in the combustor 26. A reduction in the flow of fuel to the combustor 26 (FIG. 2) may occur where, for example, coking occurs in the fuel nozzle/swirler assemblies 58 (FIG. 3). In FIG. 6, the estimated performance margin 176 of the fuel flow reduction amount is shown to be a generally linear plot line with a steady (or linear) estimated increase in the fuel flow reduction (e.g., linear increase from five percent to twenty percent) over the total operating period 174. The actual fuel flow reduction, however, may vary from the estimated fuel flow reduction due to any one or more of various factors. For example, as shown in FIG. 6, a plot line 178 represents an actual performance margin (i.e., an actual fuel flow reduction amount) that is greater than the estimated performance margin 176 (i.e., greater than the estimated fuel flow reduction) over the total operating period 174, while a plot line 180 represents an actual performance margin (i.e., an actual fuel flow reduction amount) that is less than the estimated performance margin 176 (i.e., less than the estimated fuel flow reduction amount) over the total operating period 174. As will be discussed below, a margin between the actual fuel flow reduction amount and the estimated fuel flow reduction amount (i.e., the estimated performance margin) is utilized as a basis for controlling the fuel flow split between the pilot fuel flow 116 (FIG. 3) and to main fuel flow 136 (FIG. 3) within the combustor 26 (FIG. 2).

Referring back to FIG. 5, in step S502, first through N control tables for controlling an operational aspect (e.g., a pilot/main fuel split) of the engine 10 (FIG. 1) related to the engine operating condition (e.g., related to the fuel flow reduction amount) are stored in the control table database 170 (FIG. 4). In the present aspect of FIG. 5, the first through N control tables are predefined and stored in the control table database in advance of operating the engine 10. However, in another aspect described below, the first control table may be predefined and stored in the control table database 170, while at least one of the second through N control tables may be generated by the control table generator 172 (FIG. 4) of the engine controller 71 (FIG. 4). In the present aspect, the first through N control tables may be referred to as P4 control tables that control a fuel flow split between the pilot fuel flow 116 (FIG. 3) and the main fuel flow 136 (FIG. 3), as was described above.

FIG. 7A depicts a table structure for a first P4 control table 182, according to an aspect of the present disclosure. As shown in FIG. 7A, the first P4 control table includes sub-tables, including a P4 control table 184 and a P4 control table 186. Additional sub-tables, up to a P4 control table 188, may also be included within the first P4 control table 182. FIG. 7B depicts a table structure for a second P4 control table 200 that is similar to the table structure of FIG. 7A. Thus, the second P4 control table 200 includes sub-tables, including P4 control table 202, P4 control table 204, and additional P4 control tables up to P4 control table 206. Each of a third P4 control table through an Nth P4 control table stored in the control table database 170 (FIG. 4) may have the same structure as shown in FIG. 7A and FIG. 7B.

Figure 9:
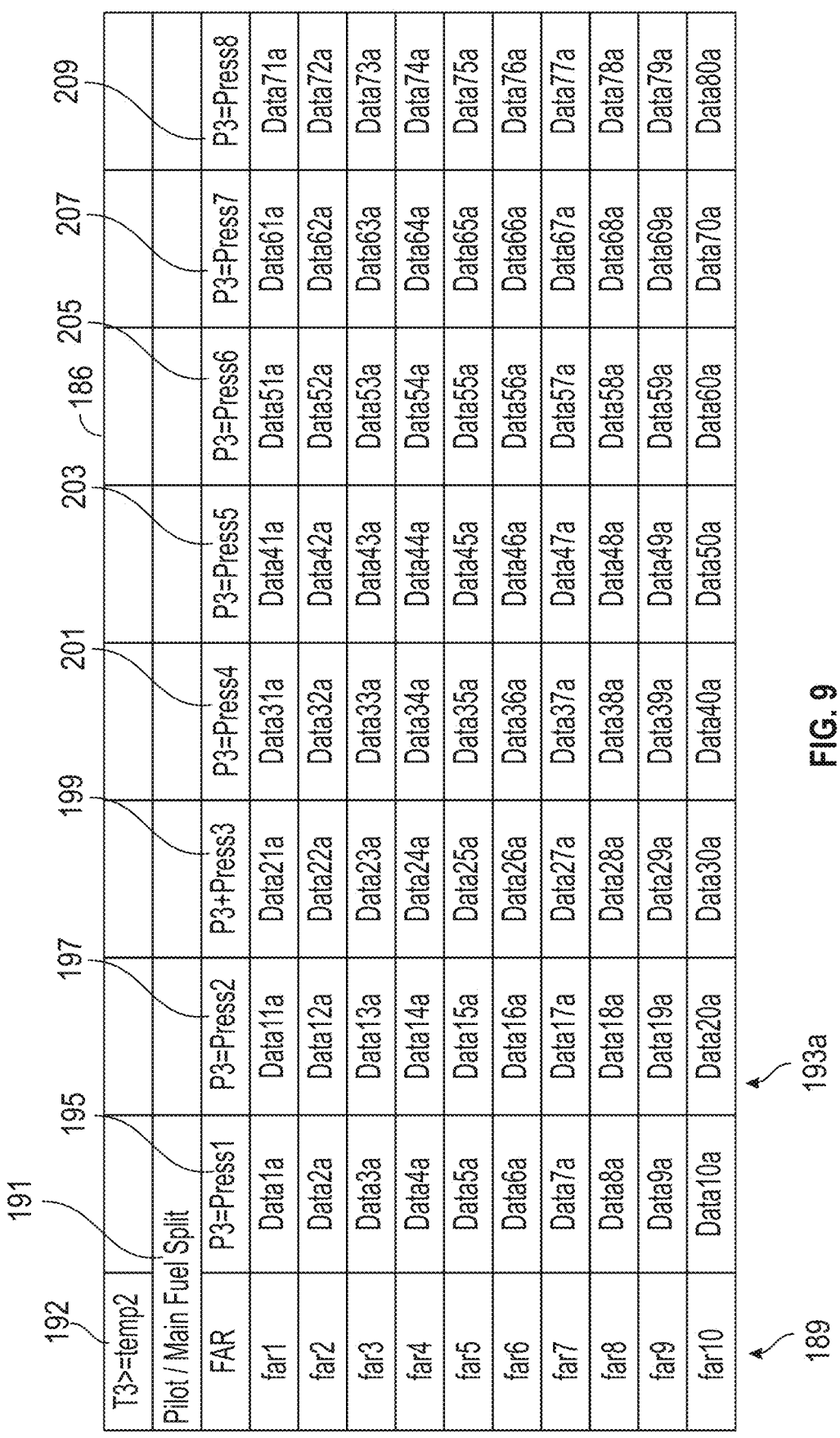
FIG. 9 depicts an example of another sub-table for the first control table that may be stored in the control table database, according to an aspect of the present disclosure.

FIG. 8 depicts an example of the P4 control table 184 that may be stored in the control table database 170 (FIG. 4), according to an aspect of the present disclosure. FIG. 9 depicts an example of the P4 control table 186 that may be stored in the control table database 170, according to an aspect of the present disclosure. Each of the sub-tables of the first P4 control table 182, including the P4 control table 184 of FIG. 8 and the P4 control table 186 of FIG. 9, corresponds to a respective compressor outlet/combustor inlet (T3) temperature. The corresponding T3 temperature may be based on readings taken by the T3 temperature sensor 74 (FIG. 2) and the P3 pressure sensor 75 (FIG. 2). For example, the P4 control table 184 of FIG. 8 includes data for a T3 temperature 190 that is greater than or equal to a temperature temp1, where temp1 may be, for example, one-thousand degrees Fahrenheit (1000° F.). The P4 control table 186 of FIG. 9 includes data for a T3 temperature 192 that is greater than or equal to a temperature temp2, where temp2 may be, for example, one-thousand fifty degrees Fahrenheit (1050° F.). The additional sub-tables up to P4 control table 188 may each correspond to a different T3 temperature, respectively.

Figure 10:
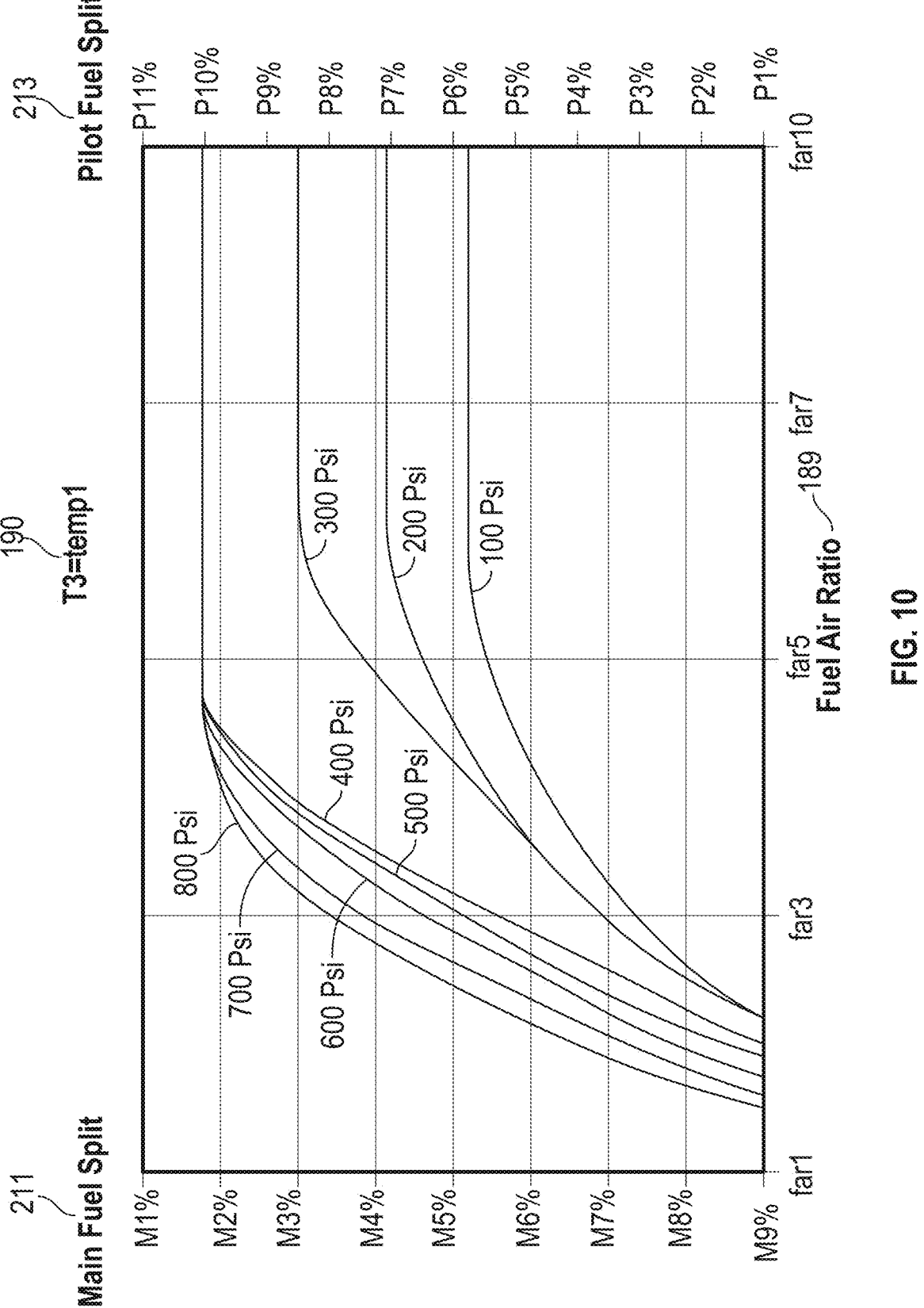
FIG. 10 is a graph depicting example plots of fuel flow splits for data included in the control table of FIG. 8, according to an aspect of the present disclosure.

The P4 control table 184 of FIG. 8 includes data 193 and the P4 control table 186 of FIG. 9 includes data 193a, where the data 193 and the data 193a is data of operational parameters (e.g., a pilot fuel split 213 and a main fuel split 211, described below for FIG. 10) for controlling an operational aspect (e.g., a pilot/main fuel split 191) for the engine 10. The data 193, being Data1, Data2, . . . , Data80 in FIG. 8, and the data 193a, being Data1a, Data2a, . . . , Data80a in FIG. 9, is based on various P3 pressures that may occur at the respective T3 temperature 190, 192. For example, as shown in both FIG. 8 and FIG. 9, the P4 control table 184 and the P4 control table 186 include the data 193 and the data 193a, respectively, related to eight different P3 pressures at the respective T3 temperature 190 (FIG. 8) and T3 temperature 192 (FIG. 9). The various P3 pressures may include a first pressure 195 ("Press1"), a second pressure 197 ("Press2"), a third pressure 199 ("Press 3"), a fourth pressure 201 ("Press4"), a fifth pressure 203 ("Press 5"), a sixth pressure 205 ("Press6"), a seventh pressure 207 ("Press7"), and an eighth pressure 209 ("Press8"). As an example, the first pressure 195 ("Press1") may be one-hundred pounds-per-square-inch (100 psi), the second pressure 197 ("Press2") may be two-hundred psi (200 psi), the third pressure 199 ("Press3") may be three-hundred psi (300 psi), the fourth pressure 201 ("Press4") may be four-hundred psi (400 psi), the fifth pressure 203 ("Press5") may be five-hundred psi (500 psi), the sixth pressure 205 ("Press6") may be six-hundred psi (600 psi), the seventh pressure 207 ("Press7") may be seven-hundred psi (700 psi), and the eighth pressure 209 ("Press8") may be eight-hundred psi (800 psi).

The data 193 (FIG. 8) and the data 193a (FIG. 9) for the pilot/main fuel split 191 (operational aspect) is also based on various fuel-to-air ratios (FAR) 189 for the combustor 26. The fuel-to-air ratios 189 may range from a first fuel-to-air ratio "far1" (e.g., 0.010) to a tenth fuel-to-air ratio "far10" (e.g., 0.060). FIG. 10 is a plot (graph) depicting an example of a main fuel split 211 and a pilot fuel split 213, utilizing the data 193 of the P4 control table 184 of FIG. 8. In FIG. 10, the main fuel split 211 may range from a main fuel split of M1% to a main fuel split of M10%, where M1% may be sixty percent and M10% may be one-hundred percent, and the pilot fuel split 213 may range from a pilot fuel split of P1% to P11%, where P1% may be zero percent and P11% may be one-hundred percent. Each of the pressures depicted in FIG. 10 correspond to the first pressure 195 through the eighth pressure 209 of FIG. 8, and the plot lines for each pressure and FAR 189 correspond to the respective data 193 of FIG. 8, where the data 193 for each respective pressure and FAR 189 includes the main fuel split 211 and the pilot fuel split 213.

Returning to FIG. 5, and to FIG. 6, in step S503, the engine controller 71 (FIG. 4) controls operating the engine 10 through a first portion 194 of the total operating period 174 utilizing the first P4 control table 182 (FIG. 7A). The first portion 194 of the total operating period 174 may be, for example, a predefined number of cycles among the total number of cycles for the total operating period 174. For example, the first portion 194 may be twenty percent of the total operating period such that, when the total operating period 174 is thirty-thousand cycles, the first portion 194 of the total operating period 174 may be seven-thousand-five-hundred cycles. Alternatively, the first portion 194 may be defined as a number of Cycles Since New (CSN), a number of Cycles Since last Shop Visit (CSSV), a Time Since New (TSN) (e.g., number of operating hours), or a Time Since last Shop Visit (TSSV).

As part of the controlling the operation of the engine 10 during the first portion 194 of the total operating period 174, the engine controller 71 (FIG. 4) controls the pilot/main fuel split 191, and, more particularly, controls the pilot fuel split 213 of the pilot fuel flow 116 (FIG. 3) to the pilot fuel injector 110, and main fuel split 211 of the main fuel flow 136 (FIG. 4) to the main fuel injector 140. Here, the engine controller 71 utilizes the first P4 control table 182 to control the fuel flow controller 83 to provide the proper fuel flow split. For example, when the T3 temperature sensor 74 senses during operation of the combustor 26 that the T3 temperature is one-thousand degrees Fahrenheit (1000° F.), the engine controller 71 may refer to the P4 control table 184 (FIG. 8). When the P3 pressure sensor 75 senses that the P3 pressure is two-hundred psi (200 psi) and the fuel-to-air ratio (FAR) 189 is to be far7, the engine controller 71 determines to use the "Data17" from among the data 193 of FIG. 8 as the pilot/main fuel split 191 data for controlling the pilot fuel split 213 and the main fuel split 211. The "Data17", when compared with the example plot of FIG. 10, may provide, for example, a fuel flow split of slightly greater than M4% for the main fuel split 211, and slightly less than P7% for the pilot fuel split 213. When the P3 pressure sensor 75 senses an increase in the P3 pressure to three-hundred psi (300 psi) and the T3 temperature remains constant at one-thousand degrees Fahrenheit, the engine controller 71 again refers to the P4 control table 184 (FIG. 8). For the same fuel-to-air ratio (FAR) 189 of far7, the engine controller 71 determines to utilize the "Data27" from among the data 193 as the pilot/main fuel split 191 data. The "Data27", when compared with the graph of FIG. 10, may provide for a fuel flow split of M3% for the main fuel split 211, and about P8.5% (where 8.5 if about fifty percent of the amount between P8% and P9%) for the pilot fuel split 213. When the T3 temperature sensor 74 senses an increase in the T3 temperature (e.g., an increase from 1000° F. to 1050° F.), then the engine controller 71 refers to the P4 control table 186 of the first P4 control table 182 to obtain the pilot/main fuel split 191 data. Thus, throughout the first portion 194 of the total operating period 174, the engine controller 71 utilizes the first P4 control table 182 (and the sub-tables therewithin) for controlling the operation of the engine 10.

In step S504, during operation of the engine 10 throughout the first portion 194 of the total operating period 174, as stated above, the engine controller 71 receives feedback data from the various sensors (e.g., sensors 74, 75, 77, 79 and 84 of FIG. 2) in the combustor 26, and, in step S505, the engine controller 71 determines whether the end of the first portion 194 of the total operating period 174 has been reached. The engine controller 71 utilizes the feedback data to, at least in part, determine which P4 control table (sub-table) of the first P4 control table 182 to utilize in controlling the fuel flow split to the combustor 26 as described above with regard to step S503. When the end of the first portion 194 of the total operating period 174 has not been reached (NO in step S505), then the engine controller 71 continues to operate the engine 10 throughout the first portion 194 of the total operating period 174 utilizing the first P4 control table 182 and continues sensing the engine operating conditions. When the end of the first portion 194 of the total operating period 174 has been reached, or when the end of the first portion 194 of the total operating period 174 is nearly reached (YES in step S505), then flow of the method executed by the engine controller 71 proceeds to step S506.

In step S506, the engine controller 71, utilizing the sensed feedback data (i.e., the T3 temperature feedback data 74a, the P3 pressure feedback data 75a, the T4 temperature feedback data 77a, the P4 pressure feedback data 79a, and the acoustic vibration feedback data 84a), determines an operational margin of the operating condition (the fuel flow reduction amount) of the estimated performance margin table 173 (i.e., determines the fuel flow reduction amount throughout the first portion 194 of the total operating period 174). Referring back to FIG. 6, as an example, the engine controller 71 (FIG. 4) may determine the operational margin throughout the first portion 194 of the total operating period 174 corresponds to the plot line 178. That is, based on the feedback data received throughout the first portion 194 of the total operating period 174, the engine controller 71 determines that the operational margin corresponds with the plot line 178 throughout the first portion 194 of the total operating period 174 and, therefore, deviates from the estimated performance margin 176 of the fuel flow reduction amount. In step S507, the engine controller 71 compares the determined operational margin (plot line 178) to the estimated performance margin 176 to determine a deviation amount 196 of the deviation from the estimated performance margin 176. That is, the engine controller 71 may determine that the deviation amount 196 of the determined fuel flow reduction is two percent (2%) greater than the estimated fuel flow reduction amount.

In step S508, based on a comparison result of the comparing and the determined operational margin, and, at least in part, based on the deviation amount 196 of the determined operational margin from the expected operational margin, the engine controller 71 determines which one of the second through Nth P4 control tables stored in the control table database 170 is to be utilized during a second portion 198 (FIG. 6) of the total operating period 174. In the present aspect of the method of FIG. 5, the second through Nth P4 control tables are predefined and stored in the control table database 170. In another aspect described below, however, the second through Nth P4 control tables may be generated by the engine controller 71 and the generated second through Nth P4 control tables may then be stored in control table database 170.

FIG. 11 depicts an example of the P4 control table 202 for the second P4 control table 200 that may be stored in the control table database 170, according to an aspect of the present disclosure. The P4 control table 202 of FIG. 11 corresponds to the P4 control table 184 (FIG. 8) in that the two tables have corresponding T3 temperatures (i.e., same T3=1000° F.), the same FAR 189, and the same P3 pressures (i.e., same P3 of 100 psi, 200 psi, 300 psi, 400 psi, 500 psi, 600 psi, 700 psi, and 800 psi). However, the P4 control table 202 of FIG. 11 includes data 215 (i.e., "Data1-1" through "Data80-1") that is different from the data 193 (i.e., "Data1" through "Data80") of the first P4 control table 182. Thus, in the prior example described above, for a T3 of 1000° F., a FAR of far7, and a P3 of 200 psi, when implementing the P4 control table 202 during the second portion 198 of the total operating period 174, the pilot/main fuel split 191 is implemented using "Data17-1", which may provide for a main fuel split 211 of slightly greater than M4% and a pilot fuel split 213 of slightly less than P7%. The difference in the fuel flow split, therefore, provides an adjustment to the main fuel split 211 and to the pilot fuel split 213 based on the deviation amount 196 indicating a greater deterioration of the combustor fuel flow than the expected amount.

FIG. 12 depicts an example of the P4 control table 204 for the second P4 control table 200 that may be stored in the control table database 170, according to an aspect of the present disclosure. The P4 control table 204 of FIG. 12 corresponds to the P4 control table 186 (FIG. 9) in that the two tables have corresponding T3 temperatures (i.e., same T3=1050° F.), the same FAR, and the same P3 pressures (i.e., same P3 of 100 psi, 200 psi, 300 psi, 400 psi, 500 psi, 600 psi, 700 psi, and 800 psi). However, the P4 control table 204 includes data 215a (i.e., "Data1a-1" through "Data80a-

1") that is different from the data 215 of the P4 control table 202. Thus, in the prior example described above, for a T3 of 1050° F., a FAR of far7, and a P3 of 300 psi, when implementing the P4 control table 204 during the second portion 198 of the total operating period 174, the pilot/main fuel split 191 is implemented using "Data27a-1", which may provide for a main fuel split 211 of about M3% and a pilot fuel split 213 of P9%. Again, the difference in the fuel flow split provides an adjustment to the main fuel split and to the pilot fuel split based on the deviation amount 196 indicating a greater deterioration of the combustor fuel flow than the expected amount.

Once the engine controller 71 has determined in step S508 which one of the second through Nth P4 control tables to utilize during the second portion 198 of the total operating period 174, in step S509, the engine controller 71 controls the operation of the engine 10 throughout the second portion 198 utilizing the determined one of the second through Nth P4 control tables. In step S510, the end of the second portion 198 of the total operating period 174 is reached, and a determination may be made in step S510 as to whether the total operating period 174 has been reached. If not (No in step S510), then the engine controller 71 returns to step S504 to sense the operating condition of the engine throughout the second portion 198 of the total operating period 174. In step S506, however, the engine controller 71 determines the operational margin of the sensed engine operating condition throughout the second portion 198 of the total operating period 174, and, in step S507, the determined operational margin is compared again with the expected operational margin. Then, based on the comparison, the engine controller 71 determines another one of the second through Nth P4 control tables (e.g., a third P4 control table) to be utilized for a third portion 208 of the total operating period 174. The engine controller 71 then operates the engine 10 throughout the third portion 208 of the total operating period 174 utilizing the third P4 control table. When, in step S510, the end of the third portion 208 of the total operating period 174 has been reached, and the engine controller 71 determines that the total operating period 174 has not yet been reached, another iteration of the flow from step S504 through S509 occurs for a fourth portion 210 of the total operating period 174 utilizing a fourth P4 control table. Once the end of the fourth portion 210 of the total operating period 174 is reached, and step S510 determines that the total operating period 174 has been reached, then, in step S511, a notification is provided to take the engine 10 offline for overhaul maintenance.

FIG. 13 is a flowchart of process steps of an alternate method of controlling the engine 10 (FIG. 1), according to an aspect of the present disclosure. The method of FIG. 13 is similar to the method of FIG. 5 in that both methods relate to controlling the pilot fuel split percentage and the main fuel split percentage for various fuel-to-air ratios and in relation to the fuel flow reduction in the combustor 26 (FIG. 2) over time. The method of FIG. 13, however, can also be implemented with regard to other operating aspects of the engine 10. Several of the process steps of FIG. 13 are implemented in the same manner as a corresponding step in FIG. 5. For example, step S1301 is the same as step S501 of FIG. 5. Thus, in step S1301, the estimated performance margin table for the expected engine operating condition (fuel flow reduction) is stored in the control table database 170 (FIG. 4) of the engine controller 71 (FIG. 4). The description provided above for step S501 is, therefore, equally applicable to step S1301.

Step S1302 is similar to step S502 of FIG. 5 in that the first P4 control table (e.g., the first P4 control table 182) for controlling the operational aspect (the fuel flow split) is predefined and stored in the control table database 170 (FIG. 4). However, in step S1302, the second through Nth P4 control tables are not predefined and stored in the control table database 170. Instead, as will be described below, the second through Nth P4 control tables are generated by the control table generator 172 (FIG. 4), and the generated second through Nth P4 control tables are then stored in the control table database 170. Steps S1303, S1304, S1305, S1306, and S1307 are the same as steps S503, S504, S505, S506, S507, respectively. Accordingly, the description provided above for steps S503 through S507 is equally applicable to steps S1303 to S1307, respectively.

In step S1308, after comparing the determined operational margin to the expected operational margin and determining the deviation amount 196 (FIG. 6) in step S1307 in the same manner as described above for steps S506 and S507, the control table generator 172 (FIG. 4) generates the second through Nth P4 control tables (e.g., generates the second P4 control table 200 of FIG. 7B, FIG. 11 and FIG. 12), and stores the generated second through Nth P4 control tables in the control table database 170 (FIG. 4). The control table generator 172 may generate the second through Nth P4 control tables by modifying the fuel split values contained in first P4 control table 182 and saving the modified tables as the second through Nth P4 control tables (e.g., saving the modified first P4 control table 182 as the second P4 control table 200). The modification of the fuel split values can be based on the deviation amount 196.

Step S1309 is the same as step S509 where the engine controller 71 (FIG. 4) controls to operate the engine 10 (FIG. 1) through the second portion 198 (FIG. 6) of the total operating period 174 (FIG. 6) utilizing the stored second through Nth P4 control tables. In the same manner described above for step S510, in step S1310, the process may loop back to step S1304 through step S1307 for the second portion 198 of the total operating period 174, and, in the second iteration of step S1308, the third P4 control table is generated and stored in the control table database 170 (FIG. 4). The third P4 control table may be generated by modifying the fuel split data of the second P4 control table 200 (FIG. 7B) by utilizing the deviation amount 196 (FIG. 6) of the second portion 198 (FIG. 6) of the total operating period 174 (FIG. 6). A third iteration may again loop back from the second iteration of step S1310 back to step S1304 so as to generate, in the third iteration of step S1308, a fourth P4 control table to be implemented throughout the fourth portion 210 (FIG. 6) of the total operating period 174 (FIG. 6). In the same manner as described above for step S510 and step S511, in step S1310, when the total operating period 174 (FIG. 6) has been reached, in step S1311, a notification can be provided to take the engine 10 offline for overhaul. Thus, the method of FIG. 13 provides for the engine controller 71 to generate the second through Nth P4 control tables rather than the second through Nth P4 control tables being predefined and stored in the control table database 170.

Figure 14B:
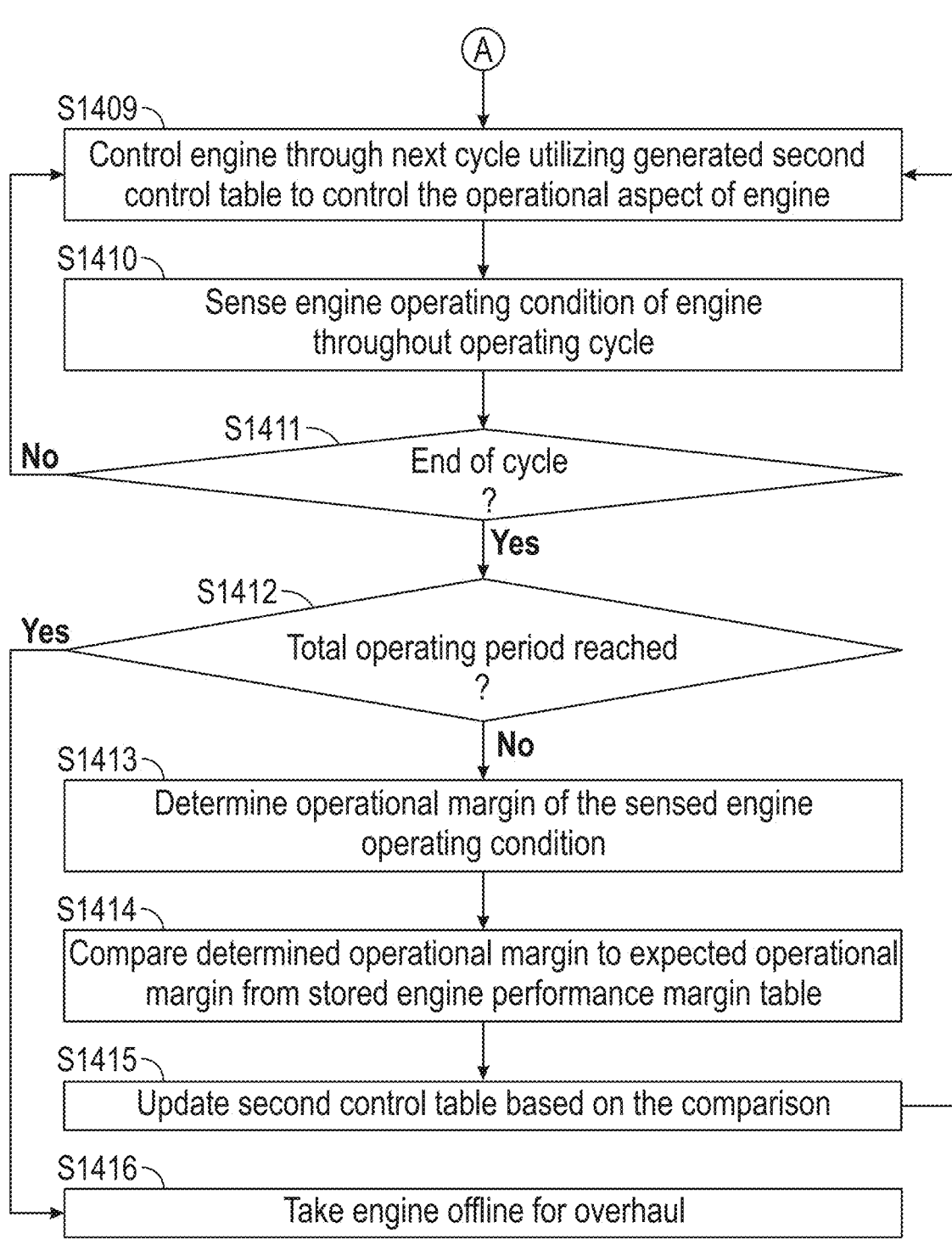

FIG. 14A and FIG. 14B combined show a flowchart of process steps of an alternate method of controlling the engine 10 (FIG. 1), according to an aspect of the present disclosure. The method of FIG. 14A and FIG. 14B, similar to the FIG. 13 method, also provides for the engine controller 71 (FIG. 4) to generate the second P4 control table rather than the second P4 control table being predefined. However, in contrast to the FIG. 13 method where the second through Nth P4 control tables are generated after the completion of many cycles constituting the respective portion of the total operating period 174 (FIG. 6), in the FIG. 14A and FIG. 14B method, the second P4 control table is generated and then updated more frequently (e.g., after every cycle) so as to continuously update the second P4 control table. In FIG. 14A, steps S1401, S1402, S1403, S1404, and S1405 are the same as steps S1301, S1302, S1303, S1304, and S1305 (FIG. 13), respectively. That is, to summarize, the estimated performance margin table is stored in the control table database 170 (step S1401), the first P4 control table 182 (FIG. 7A) is stored in the control table database 170 (step S1402), the engine 10 (FIG. 1) is operated throughout the first portion 194 (FIG. 6) of the total operating period 174 (FIG. 6) utilizing the first P4 control table 182 (step S1403), and the engine operating condition (e.g., the fuel flow reduction) is sensed throughout the first portion 194 (FIG. 6) of the total operating period 174 (step S1404). Once the end of the first portion 194 of the total operating period 174 is reached (YES in step S1405), then, step S1406 and step S1407 are performed in the same manner described above for steps S1306 and S1307. That is, the engine controller 71 (FIG. 4) determines the operational margin of the sensed operating condition (step S1406), and compares the determined operational margin to the expected operational margin (step S1407). Then, in step S1408, similar to step S1308 of FIG. 13, the engine controller 71 generates the second P4 control table 200 and stores the generated second P4 control table 200 in the control table database 170. One difference between step S1408 and step S1308 is that, in the present aspect, only the second P4 control table 200 is generated, while, in step S1308, the second through Nth P4 control tables are generated and stored in the control table database 170.

Continuing with the present method and FIG. 14B, in step S1409, the engine controller 71 (FIG. 4) controls operation to operate the engine 10 (FIG. 1) throughout a next cycle utilizing the second P4 control table 200 (FIG. 7B) generated and stored in the control table database 170 (FIG. 4) in step S1408. Here, another difference between the present method and the method of FIG. 13 is that, in step S1309, the engine controller 71 operates the engine 10 throughout the second portion 198 (FIG. 6) of the total operating period 174 (FIG. 6), where the second portion 198 consists of multiple cycles (e.g., five thousand cycles), whereas step S1409 relates only to operating the engine 10 through the next (single) operating cycle. Similar to step S1404, in step S1410, the engine operating condition (fuel flow reduction) is sensed during the operating of the engine 10 in the next cycle of step S1409. In step S1411, the engine controller 71 (FIG. 4) determines whether the end of the current operating cycle has been reached, and if not (NO in step S1411), then the engine controller 71 continues to operate the engine 10 utilizing the present second P4 control table 200 (FIG. 7B). If the engine controller 71 determines in step S1411 that the end of the cycle has occurred (YES in step S1411), then the engine controller 71 may also determine in step S1412 whether the end of the total operating period 174 (FIG. 6) has been reached. If so (YES in step S1412), then the engine controller 71 issues a notification to take the engine 10 offline for overhaul in step S1416.

On the other hand, when the end of the total operating period 174 has not been reached (NO in step S1412), then, in step S1413, the engine controller 71 determines the operational margin of the sensed engine operation condition for the most recent cycle, and, in step S1414, compares the determined operational margin for the most recent cycle with the expected operational margin. Steps S1413 and S1414 are similar to steps S1406 and S1407, but utilize the sensed data from the most recent cycle rather than utilizing the sensed data from an entire portion (e.g., the second portion 198) of the total operating period 174. Then, in step S1415, the second P4 control table 200 is updated based on the comparison. Thus, the second P4 control table 200 (FIG. 7B) is updated to a modified second P4 control table 200a, having modified sub-tables in the form of modified second P4 control table 202a, modified P4 control table 204a, and other modified sub-tables up to modified P4 control table 206a. The modified second P4 control table 200a may have one or more modified fuel flow data items, while the T3 temperature, P3 pressures, and fuel-to-air ratios in each sub-table remain constant. The modified second P4 control table 200a is stored in the control table database 170, and the method returns to step S1409 for the next cycle of the engine 10.

The process from step S1409 through S1415 is then repeated during the next operating cycle of the engine 10, where, in the next cycle, the engine controller 71 utilizes the modified second P4 control table 200a to operate the engine 10. Once the method reaches step S1415 again, the modified second P4 control table 200a is modified again. The loop from step S1409 through step S1415 continues for each next cycle of the engine 10 until step S1412 determines that the total operating period 174 has been reached (YES in step S1412), such that the engine 10 is then taken offline for overhaul in step S1416. Thus, the present aspect of FIG. 14A and FIG. 14B provides for continuously updating the second P4 control table 200 on a cycle-by-cycle basis, once the baseline second P4 control table 200 has been generated utilizing the first P4 control table 182 to control the operation of the engine 10 through the first portion 194 of the total operating period 174.

While the method of FIG. 14A and FIG. 14B is described with regard to updating the second P4 control table 200 after every cycle, the same method of FIG. 14A and FIG. 14B may instead be implemented to periodically update the second P4 control table 200 during a cycle of operation of the engine 10. That is, whereas a cycle may constitute a two hour flight from engine startup to engine shutdown, the cycle of step S1411 may instead constitute a run time of the engine 10 (e.g., a cycle run time of every ten minutes). In this case, the second P4 control table 200 would be updated more frequently. Moreover, the method may implement a machine learning process such that, for example, steps S1413 through S1415 may be implemented, at least in part, based on a machine learning algorithm that predicts the determined operational margin in step S1413.

Figure 15:
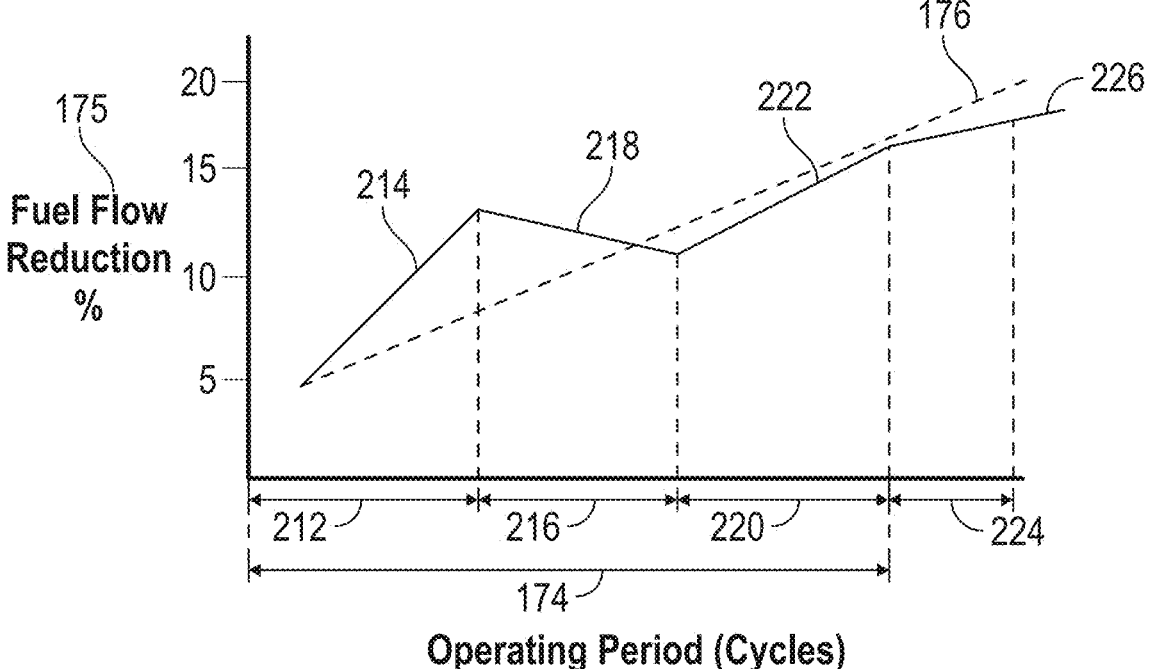
FIG. 15 is a graph (plot) of an exemplary fuel flow reduction over different operating portions of the gas turbine engine of FIG. 1, according to an aspect of the present disclosure.

Each of the foregoing methods is described with regard to a generally linear change in the fuel flow reduction amount, as shown by the linear plot of the estimated performance margin 176 of FIG. 6. In addition, each of the foregoing methods assumes that a generally deviation of the fuel flow reduction amount may occur, as shown by the plot line 178, for example. However, an actual fuel flow reduction amount may vary much more drastically than the linear change shown in FIG. 6. FIG. 15 is a graph (plot) of an exemplary fuel flow reduction over different operating portions of the engine 10. For example, in a first portion 212 of the total operating period 174, the fuel flow reduction amount may plot along a plot line 214 in which a greater amount of deterioration occurs at a steeper rate than the expected fuel flow reduction based on the estimated performance margin 176. For example, the engine 10 may be placed into service on an aircraft in a harsh environment, such as a desert environment where sand and other particulate matter may fill the air and cause a faster degradation of the engine 10. Any one of the methods described above could be implemented to provide for utilizing the first P4 control table 182 during the first portion 212, even though the fuel flow reduction amount has a greater deviation from the expected fuel flow reduction amount. In contrast, during a second portion 216 of the total operating period 174, the fuel flow reduction amount may improve rather than decline, as shown by a plot line 218. An improvement may occur when, for example, the aircraft is moved to a more favorable environment, or when a compressor water wash has been provided. Any of the methods described above may be implemented to utilize or to generate a second P4 control table that accommodates such an improvement in performance over the expected performance. The methods are equally applicable to control the engine 10 through a third portion 220 of the total operating period 174 where, again, as shown by a plot line 222, a deterioration in the fuel flow reduction greater than the expected fuel flow reduction is present, and through a fourth portion 224 of the total operating period 174 where, as shown in by a plot line 226, a fuel flow reduction amount that is less than the expected fuel flow reduction amount is present.

Further aspects of the present disclosure are provided by the subject matter of the following clauses.

A method of operating a gas turbine engine, the gas turbine engine including (a) a compressor section, (b) a combustor, (c) a turbine section, and (d) an engine controller that includes a processing circuit and a memory storing (i) an engine control program for controlling operation of the gas turbine engine, (ii) an estimated performance margin table plotting an estimated performance margin of an engine operating condition throughout a total operating period of the gas turbine engine, (iii) a first control table including first data of operational parameters for controlling an operational aspect related to the engine operating condition of the estimated performance margin table, and (iv) at least one second through N control table including second through N data, respectively, of operational parameters for controlling the operational aspect related to the engine operating condition of the estimated performance margin table, the method implemented by the engine controller including controlling operating of the gas turbine engine through a first portion of the total operating period utilizing the first data of the first control table to control the operational aspect related to the engine operating condition of the estimated performance margin table, selecting one of the second through N control tables for operating the gas turbine engine through a second portion of the total operating period of the gas turbine engine, and controlling operating of the gas turbine engine through the second portion of the total operating period utilizing the second through N data of the respective control table selected in the selecting to control the operational aspect related to the engine operating condition of the estimated performance margin table.

The method according to the preceding clause further including during the controlling operating of the gas turbine engine through the first portion of the total operating period, sensing the engine operating condition of the estimated performance margin table, determining an operational performance margin of the engine operating condition for the first portion of the total operating period, comparing the determined operational performance margin of the engine operating condition to the estimated performance margin of the estimated performance margin table for the first portion of the total operating period, and determining, based on a comparison result of the comparing, the one of the second through N control tables to be selected in the selecting.

The method according to any preceding clause, wherein the total operating period of the gas turbine engine defines an estimated Time Before Overhaul (TBO), and the first portion of the total operating period is one of a Time Since New (TSN), a Time Since last Shop Visit (TSSV), a Cycles Since New (CSN), or a Cycles Since last Shop Visit (CSSV).

The method according to any preceding clause, wherein the first control table and the second through N control tables are predefined and stored in the memory.

The method according to any preceding clause, wherein the first control table is predefined and stored in the memory, and the method further includes during the controlling operating of the gas turbine engine through the first portion of the total operating period, sensing the engine operating condition of the estimated performance margin table, determining an operational performance margin of the engine operating condition for the first portion of the total operating period, the engine controller generating at least one of the second through N control tables based on the determined operational performance margin of the engine operating condition, and storing the generated at least one of the second through N control tables in the memory.

The method according to any preceding clause, wherein the controlling of the gas turbine engine through the second portion of the total operating period utilizes at least one of the generated second through N control tables stored in the memory.

The method according to any preceding clause, the method further including during the controlling operating of the gas turbine engine through the second portion of the total operating period, sensing the engine operating condition of the estimated performance margin table, periodically, throughout the second portion of the total operating period, determining an operational performance margin of the engine operating condition based on the sensed engine operating condition, periodically, throughout the second portion of the total operating period, updating the second control table stored in the memory based on the determined operational performance margin to obtain a periodically updated second control table, and controlling operating of the gas turbine engine throughout the second portion of the total operating period utilizing the periodically updated second control table.

The method according to any preceding clause, wherein the periodically determining comprises a period of one cycle of the engine, and the periodically updated second control table is updated after each one cycle of the engine.

The method according to any preceding clause, wherein the engine operating condition of the estimated performance margin table is a fuel flow reduction amount within the combustor.

The method according to any preceding clause, wherein the combustor includes at least one fuel nozzle/swirler assembly having a pilot mixer that receives a pilot fuel flow of fuel, and a main mixer that receives a main fuel flow of the fuel.

The method according to any preceding clause, wherein the operational aspect comprises a fuel split percentage for a main fuel split of the main fuel flow and a pilot fuel split of the pilot fuel flow.

The method according to any preceding clause, wherein respective ones of the first control table and the second through N control tables corresponds to a respective compressor outlet/combustor inlet temperature (T3), and each of the first control table and the second through N control tables includes main fuel split percentage data and pilot fuel split percentage data at a plurality of fuel-to-air ratios at respective ones of a plurality of compressor outlet/combustor inlet pressures (P3) for the respective compressor outlet/combustor inlet temperature (T3).

An engine controller for controlling operation of a gas turbine engine, the engine controller including a processing circuit, and a memory storing (a) an engine control program for controlling operation of the gas turbine engine, (b) an estimated performance margin table plotting an estimated performance margin of an engine operating condition throughout an operating period of the gas turbine engine, (c) a first control table including first data of operational parameters for controlling an operational aspect related to the engine operating condition of the estimated performance margin table, and (d) at least one second through N control table including second through N data, respectively, of operational parameters for controlling the operational aspect related to the engine operating condition of the estimated performance margin table, the processing circuit executing the engine control program to perform controlling operating of the gas turbine engine through a first portion of the operating period utilizing the first data of the first control table to control the operational aspect related to the engine operating condition of the estimated performance margin table, selecting one of the second through N control tables for operating the gas turbine engine through a second portion of the operating period of the gas turbine engine, and controlling operating of the gas turbine engine through the second portion of the operating period utilizing the second through N data of the respective control table selected in the selecting to control the operational aspect related to the engine operating condition of the estimated performance margin table.

The engine controller according to the preceding clause, the processing circuit further performing during the controlling of the gas turbine engine through the first portion of the total operating period, sensing the engine operating condition of the estimated performance margin table, determining an operational performance margin of the engine operating condition for the first portion of the total operating period, comparing the determined operational performance margin of the engine operating condition to the estimated performance margin of the estimated performance margin table for the first portion of the total operating period, and determining, based on a comparison result of the comparing, the one of the second through N control tables to be selected in the selecting.

The engine controller according to any preceding clause, wherein the first control table and the second through N control tables are predefined and stored in the memory.

The engine controller according to any preceding clause, wherein the first control table is predefined and stored in the memory, and the processing circuit further performs during the controlling operating of the gas turbine engine through the first portion of the total operating determining an operational performance margin of the engine operating condition for the first portion of the total operating period, the engine controller generating at least one of the second through N control tables based on the determined operational performance margin of the engine operating condition, and storing the generated at least one of the second through N control tables in the memory.

The engine controller according to any preceding clause, the processing circuit further performing during the controlling operating of the gas turbine engine through the second portion of the total operating period, sensing the engine operating condition of the estimated performance margin table, periodically, throughout the second portion of the total operating period, determining an operational performance margin of the engine operating condition based on the sensed engine operating condition, periodically, throughout the second portion of the total operating period, updating the second control table stored in the memory based on the determined operational performance margin to obtain a periodically updated second control table, and controlling operating of the gas turbine engine throughout the second portion of the total operating period utilizing the periodically updated second control table.

The engine controller according to any preceding clause, wherein the periodically determining comprises a period of one cycle of the engine, and the periodically updated second control table is updated after each one cycle of the engine.

The engine controller according to any preceding clause, wherein the engine operating condition of the estimated performance margin table is a fuel flow reduction amount within a combustor of the gas turbine engine.

The engine controller according to any preceding clause, wherein the operational aspect comprises a fuel flow percentage between a pilot fuel flow split of fuel to be provided to a pilot mixer and a main fuel flow split of the fuel to be provided to a main mixer.

A method of operating a gas turbine engine, the gas turbine engine including (a) a compressor section, (b) a combustor, (c) a turbine section, and (d) an engine controller that includes a processing circuit and a memory storing (i) an engine control program for controlling operation of the gas turbine engine, (ii) an estimated performance margin table plotting an estimated performance margin of an engine operating condition throughout a total operating period of the gas turbine engine, (iii) a first control table including first data of operational parameters for controlling an operational aspect related to the engine operating condition of the estimated performance margin table, and (iv) at least one second through N control table including second through N data, respectively, of operational parameters for controlling the operational aspect related to the engine operating condition of the estimated performance margin table, the method implemented by the engine controller including controlling operating of the gas turbine engine through a first portion of the total operating period utilizing the first data of the first control table to control the operational aspect related to the engine operating condition of the estimated performance margin table, selecting one of the second through N control tables for operating the gas turbine engine through a second portion of the total operating period of the gas turbine engine, controlling operating of the gas turbine engine through the second portion of the total operating period utilizing the second through N data of the respective control table selected in the selecting to control the operational aspect related to the engine operating condition of the estimated performance margin table, wherein the first control table is predefined and stored in the memory, during the controlling operating of the gas turbine engine through the first portion of the total operating period, sensing the engine operating condition of the estimated performance margin table, determining an operational performance margin of the engine operating condition for the first portion of the total operating period, the engine controller generating at least one of the second through N control tables based on the determined operational performance margin of the engine operating condition, and storing the generated at least one of the second through N control tables in the memory.

The method according to the preceding clause, further including during the controlling operating of the gas turbine engine through the first portion of the total operating period, sensing the engine operating condition of the estimated performance margin table, determining an operational performance margin of the engine operating condition for the first portion of the total operating period, comparing the determined operational performance margin of the engine operating condition to the estimated performance margin of the estimated performance margin table for the first portion of the total operating period, and determining, based on a comparison result of the comparing, the one of the second through N control tables to be selected in the selecting.

The method according to any preceding clause, wherein the total operating period of the gas turbine engine defines an estimated Time Before Overhaul (TBO), and the first portion of the total operating period is one of a Time Since New (TSN), a Time Since last Shop Visit (TSSV), a number of Cycles Since New (CSN), or a number of Cycles Since last Shop Visit (CSSV).

The method according to any preceding clause, wherein the controlling of the gas turbine engine through the second portion of the total operating period utilizes at least one of the generated second through N control tables stored in the memory.

The method according to any preceding clause, wherein the engine operating condition of the estimated performance margin table is a fuel flow reduction amount within the combustor.

The method according to any preceding clause, wherein the combustor includes at least one fuel nozzle/swirler assembly having a pilot mixer that receives a pilot fuel flow of fuel, and a main mixer that receives a main fuel flow of the fuel.

The method according to any preceding clause, wherein the operational aspect comprises a fuel split percentage for a main fuel split of the main fuel flow and a pilot fuel split of the pilot fuel flow.

The method according to any preceding clause, wherein respective ones of the first control table and the second through N control tables corresponds to a respective compressor outlet/combustor inlet temperature (T3), and each of the first control table and the second through N control tables includes main fuel split percentage data and pilot fuel split percentage data at a plurality of fuel-to-air ratios at respective ones of a plurality of compressor outlet/combustor inlet pressures (P3) for the respective compressor outlet/combustor inlet temperature (T3).

A method of operating a gas turbine engine, the gas turbine engine including (a) a compressor section, (b) a combustor, (c) a turbine section, and (d) an engine controller that includes a processing circuit and a memory storing (i) an engine control program for controlling operation of the gas turbine engine, (ii) an estimated performance margin table plotting an estimated performance margin of an engine operating condition throughout a total operating period of the gas turbine engine, (iii) a first control table including first data of operational parameters for controlling an operational aspect related to the engine operating condition of the estimated performance margin table, and (iv) at least one second through N control table including second through N data, respectively, of operational parameters for controlling the operational aspect related to the engine operating condition of the estimated performance margin table, the method implemented by the engine controller including controlling operating of the gas turbine engine through a first portion of the total operating period utilizing the first data of the first control table to control the operational aspect related to the engine operating condition of the estimated performance margin table, selecting one of the second through N control tables for operating the gas turbine engine through a second portion of the total operating period of the gas turbine engine, controlling operating of the gas turbine engine through the second portion of the total operating period utilizing the second through N data of the respective control table selected in the selecting to control the operational aspect related to the engine operating condition of the estimated performance margin table, during the controlling operating of the gas turbine engine through the second portion of the total operating period, sensing the engine operating condition of the estimated performance margin table, periodically, throughout the second portion of the total operating period, determining an operational performance margin of the engine operating condition based on the sensed engine operating condition, periodically, throughout the second portion of the total operating period, updating the second control table stored in the memory based on the determined operational performance margin to obtain a periodically updated second control table, and controlling operating of the gas turbine engine throughout the second portion of the total operating period utilizing the periodically updated second control table.

The method according to the preceding clause, further including during the controlling operating of the gas turbine engine through the first portion of the total operating determining an operational performance margin of the engine operating condition for the first portion of the total operating period, comparing the determined operational performance margin of the engine operating condition to the estimated performance margin of the estimated performance margin table for the first portion of the total operating period, and determining, based on a comparison result of the comparing, the one of the second through N control tables to be selected in the selecting.

The method according to any preceding clause, wherein the total operating period of the gas turbine engine defines an estimated Time Before Overhaul (TBO), and the first portion of the total operating period is one of a Time Since New (TSN), a Time Since last Shop Visit (TSSV), a number of Cycles Since New (CSN), or a number of Cycles Since last Shop Visit (CSSV).

The method according to any preceding clause, wherein the periodically determining comprises a period of one cycle of the engine, and the periodically updated second control table is updated after each one cycle of the engine.

The method according to any preceding clause, wherein the engine operating condition of the estimated performance margin table is a fuel flow reduction amount within the combustor.

The method according to any preceding clause, wherein the combustor includes at least one fuel nozzle/swirler assembly having a pilot mixer that receives a pilot fuel flow of fuel, and a main mixer that receives a main fuel flow of the fuel.

The method according to any preceding clause, wherein the operational aspect comprises a fuel split percentage for a main fuel split of the main fuel flow and a pilot fuel split of the pilot fuel flow.

The method according to any preceding clause, wherein respective ones of the first control table and the second through N control tables corresponds to a respective compressor outlet/combustor inlet temperature (T3), and each of the first control table and the second through N control tables includes main fuel split percentage data and pilot fuel split percentage data at a plurality of fuel-to-air ratios at respective ones of a plurality of compressor outlet/combustor inlet pressures (P3) for the respective compressor outlet/combustor inlet temperature (T3).

An engine controller for controlling operation of a gas turbine engine, the engine controller including a processing circuit, and a memory storing (a) an engine control program for controlling operation of the gas turbine engine, (b) an estimated performance margin table plotting an estimated performance margin of an engine operating condition throughout a total operating period of the gas turbine engine, (c) a first control table including first data of operational parameters for controlling an operational aspect related to the engine operating condition of the estimated performance margin table, and (d) at least one second through N control table including second through N data, respectively, of operational parameters for controlling the operational aspect related to the engine operating condition of the estimated performance margin table, the processing circuit executing the engine control program to perform, controlling operating of the gas turbine engine through a first portion of the total operating period utilizing the first data of the first control table to control the operational aspect related to the engine operating condition of the estimated performance margin table, selecting one of the second through N control tables for operating the gas turbine engine through a second portion of the total operating period of the gas turbine engine, controlling operating of the gas turbine engine through the second portion of the total operating period utilizing the second through N data of the respective control table selected in the selecting to control the operational aspect related to the engine operating condition of the estimated performance margin table, wherein the first control table is predefined and stored in the memory, and the processing circuit further performs, during the controlling operating of the gas turbine engine through the first portion of the total operating period, sensing the engine operating condition of the estimated performance margin table, determining an operational performance margin of the engine operating condition for the first portion of the total operating period, the engine controller generating at least one of the second through N control tables based on the determined operational performance margin of the engine operating condition, and storing the generated at least one of the second through N control tables in the memory.

The engine controller according to the preceding clause, wherein the processing circuit further performs during the controlling of the gas turbine engine through the first portion of the total operating period, sensing the engine operating condition of the estimated performance margin table, determining an operational performance margin of the engine operating condition for the first portion of the total operating period, comparing the determined operational performance margin of the engine operating condition to the estimated performance margin of the estimated performance margin table for the first portion of the total operating period, and determining, based on a comparison result of the comparing, the one of the second through N control tables to be selected in the selecting.

The engine controller according to any preceding clause, wherein the total operating period of the gas turbine engine defines an estimated Time Before Overhaul (TBO), and the first portion of the total operating period is one of a Time Since New (TSN), a Time Since last Shop Visit (TSSV), a number of Cycles Since New (CSN), or a number of Cycles Since last Shop Visit (CSSV).

The engine controller according to any preceding clause, wherein the engine operating condition of the estimated performance margin table is a fuel flow reduction amount within the combustor.

The engine controller according to any preceding clause, wherein the combustor includes at least one fuel nozzle/swirler assembly having a pilot mixer that receives a pilot fuel flow of fuel, and a main mixer that receives a main fuel flow of the fuel.

The engine controller according to any preceding clause, wherein the operational aspect comprises a fuel split percentage for a main fuel split of the main fuel flow and a pilot fuel split of the pilot fuel flow.

The engine controller according to any preceding clause, wherein respective ones of the first control table and the second through N control tables corresponds to a respective compressor outlet/combustor inlet temperature (T3), and each of the first control table and the second through N control tables includes main fuel split percentage data and pilot fuel split percentage data at a plurality of fuel-to-air ratios at respective ones of a plurality of compressor outlet/combustor inlet pressures (P3) for the respective compressor outlet/combustor inlet temperature (T3).

An engine controller for controlling operation of a gas turbine engine, the engine controller including a processing circuit, and a memory storing (a) an engine control program for controlling operation of the gas turbine engine, (b) an estimated performance margin table plotting an estimated performance margin of an engine operating condition throughout a total operating period of the gas turbine engine, (c) a first control table including first data of operational parameters for controlling an operational aspect related to the engine operating condition of the estimated performance margin table, and (d) at least one second through N control table including second through N data, respectively, of operational parameters for controlling the operational aspect related to the engine operating condition of the estimated performance margin table, the processing circuit executing the engine control program to perform, controlling operating of the gas turbine engine through a first portion of the total operating period utilizing the first data of the first control table to control the operational aspect related to the engine operating condition of the estimated performance margin table, selecting one of the second through N control tables for operating the gas turbine engine through a second portion of the total operating period of the gas turbine engine, controlling operating of the gas turbine engine through the second portion of the total operating period utilizing the second through N data of the respective control table selected in the selecting to control the operational aspect related to the engine operating condition of the estimated performance margin table, during the controlling operating of the gas turbine engine through the second portion of the total operating period, sensing the engine operating condition of the estimated performance margin table, periodically, throughout the second portion of the total operating period, determining an operational performance margin of the engine operating condition based on the sensed engine operating condition, periodically, throughout the second portion of the total operating period, updating the second control table stored in the memory based on the determined operational performance margin to obtain a periodically updated second control table, and controlling operating of the gas turbine engine throughout the second portion of the total operating period utilizing the periodically updated second control table.

The engine controller according to the preceding clause, the processing circuit further performing during the controlling of the gas turbine engine through the first portion of the total operating period, sensing the engine operating condition of the estimated performance margin table, determining an operational performance margin of the engine operating condition for the first portion of the total operating period, comparing the determined operational performance margin of the engine operating condition to the estimated performance margin of the estimated performance margin table for the first portion of the total operating period, and determining, based on a comparison result of the comparing, the one of the second through N control tables to be selected in the selecting.

The engine controller according to any preceding clause, wherein the periodically determining comprises a period of one cycle of the engine, and the periodically updated second control table is updated after each one cycle of the engine.

The engine controller according to any preceding clause, wherein the engine operating condition of the estimated performance margin table is a fuel flow reduction amount within a combustor of the gas turbine engine.

The engine controller according to any preceding clause, wherein the operational aspect comprises a fuel flow percentage between a pilot fuel flow split of fuel to be provided to a pilot mixer and a main fuel flow split of the fuel to be provided to a main mixer.

Although the foregoing description is directed to some exemplary embodiments of the present disclosure, other variations and modifications will be apparent to those skilled in the art, and may be made without departing from the disclosure. Moreover, features described in connection with one embodiment of the present disclosure may be used in conjunction with other embodiments, even if not explicitly stated above.

We claim:

1. A method of operating a gas turbine engine, the gas turbine engine including (a) a compressor section, (b) a combustor, (c) a turbine section, and (d) an engine controller that includes a processing circuit and a memory storing (i) an engine control program for controlling operation of the gas turbine engine, (ii) an estimated performance margin table plotting an estimated performance margin of an engine operating condition throughout a total operating period of the gas turbine engine, (iii) a first control table including first data of operational parameters for controlling an operational aspect related to the engine operating condition of the estimated performance margin table, and (iv) at least one second through N control table including second through N data, respectively, of the operational parameters for controlling the operational aspect related to the engine operating condition of the estimated performance margin table, the method implemented by the engine controller comprising:

controlling operating of the gas turbine engine through a first portion of the total operating period utilizing the first data of the first control table to control the operational aspect related to the engine operating condition of the estimated performance margin table;

selecting one of the second through N control tables for operating the gas turbine engine through a second portion of the total operating period of the gas turbine engine; and controlling operating of the gas turbine engine through the second portion of the total operating period utilizing the second through N data of the respective control table selected in the selecting to control the operational aspect related to the engine operating condition of the estimated performance margin table, wherein the engine operating condition of the estimated performance margin table is a fuel flow reduction amount within the combustor.

2. The method according to claim 1, further comprising:

during the controlling operating of the gas turbine engine through the first portion of the total operating period, sensing the engine operating condition of the estimated performance margin table;

determining an operational performance margin of the engine operating condition for the first portion of the total operating period;

comparing the determined operational performance margin of the engine operating condition to the estimated performance margin of the estimated performance margin table for the first portion of the total operating period; and determining, based on a comparison result of the comparing, the one of the second through N control tables to be selected in the selecting.

3. The method according to claim 1, wherein the total operating period of the gas turbine engine defines an estimated Time Before Overhaul (TBO), and the first portion of the total operating period is one of a Time Since New (TSN), a Time Since last Shop Visit (TSSV), a number of Cycles Since New (CSN), or a number of Cycles Since last Shop Visit (CSSV).

4. The method according to claim 1, wherein the first control table and the second through N control tables are predefined and stored in the memory.

5. The method according to claim 1, wherein the first control table is predefined and stored in the memory, and the method further comprises:

during the controlling operating of the gas turbine engine through the first portion of the total operating period, sensing the engine operating condition of the estimated performance margin table;

determining an operational performance margin of the engine operating condition for the first portion of the total operating period;

the engine controller generating at least one of the second through N control tables based on the determined operational performance margin of the engine operating condition; and storing the generated at least one of the second through N control tables in the memory.

6. The method according to claim 5, wherein the controlling of the gas turbine engine through the second portion of the total operating period utilizes at least one of the generated second through N control tables stored in the memory.

7. The method according to claim 1, the method further comprising:

during the controlling operating of the gas turbine engine through the second portion of the total operating period, sensing the engine operating condition of the estimated performance margin table;

periodically, throughout the second portion of the total operating period, determining an operational performance margin of the engine operating condition based on the sensed engine operating condition;

periodically, throughout the second portion of the total operating period, updating the second control table stored in the memory based on the determined operational performance margin to obtain a periodically updated second control table; and controlling operating of the gas turbine engine throughout the second portion of the total operating period utilizing the periodically updated second control table.

8. The method according to claim 7, wherein the periodically determining comprises a period of one cycle of the engine, and the periodically updated second control table is updated after each one cycle of the engine.

9. The method according to claim 1, wherein the combustor includes at least one fuel nozzle/swirler assembly having a pilot mixer that receives a pilot fuel flow of fuel, and a main mixer that receives a main fuel flow of the fuel.

10. The method according to claim 9, wherein the operational aspect comprises a fuel split percentage for a main fuel split of the main fuel flow and a pilot fuel split of the pilot fuel flow.

11. The method according to claim 10, wherein respective ones of the first control table and the second through N control tables corresponds to a respective compressor outlet/combustor inlet temperature (T3), and each of the first control table and the second through N control tables includes main fuel split percentage data and pilot fuel split percentage data at a plurality of fuel-to-air ratios at respective ones of a plurality of compressor outlet/combustor inlet pressures (P3) for the respective compressor outlet/combustor inlet temperature (T3).

12. An engine controller for controlling operation of a gas turbine engine, the engine controller comprising:

a processing circuit; and a memory storing (a) an engine control program for controlling operation of the gas turbine engine, (b) an estimated performance margin table plotting an estimated performance margin of an engine operating condition throughout a total operating period of the gas turbine engine, (c) a first control table including first data of operational parameters for controlling an operational aspect related to the engine operating condition of the estimated performance margin table, and (d) at least one second through N control table including second through N data, respectively, of the operational parameters for controlling the operational aspect related to the engine operating condition of the estimated performance margin table, the processing circuit executing the engine control program to perform:

controlling operating of the gas turbine engine through a first portion of the total operating period utilizing the first data of the first control table to control the operational aspect related to the engine operating condition of the estimated performance margin table;

selecting one of the second through N control tables for operating the gas turbine engine through a second portion of the total operating period of the gas turbine engine; and controlling operating of the gas turbine engine through the second portion of the total operating period utilizing the second through N data of the respective control table selected in the selecting to control the operational aspect related to the engine operating condition of the estimated performance margin table, wherein the engine operating condition of the estimated performance margin table is a fuel flow reduction amount within a combustor of the gas turbine engine.

13. The engine controller according to claim 12, the processing circuit further performing:

during the controlling of the gas turbine engine through the first portion of the total operating period, sensing the engine operating condition of the estimated performance margin table;

determining an operational performance margin of the engine operating condition for the first portion of the total operating period;

comparing the determined operational performance margin of the engine operating condition to the estimated performance margin of the estimated performance margin table for the first portion of the total operating period; and determining, based on a comparison result of the comparing, the one of the second through N control tables to be selected in the selecting.

14. The engine controller according to claim 12, wherein the first control table and the second through N control tables are predefined and stored in the memory.

15. The engine controller according to claim 12, wherein the first control table is predefined and stored in the memory, and the processing circuit further performs:

during the controlling operating of the gas turbine engine through the first portion of the total operating period, sensing the engine operating condition of the estimated performance margin table;

determining an operational performance margin of the engine operating condition for the first portion of the total operating period;

the engine controller generating at least one of the second through N control tables based on the determined operational performance margin of the engine operating condition; and storing the generated at least one of the second through N control tables in the memory.

16. The engine controller according to claim 12, the processing circuit further performing:

during the controlling operating of the gas turbine engine through the second portion of the total operating period, sensing the engine operating condition of the estimated performance margin table;

periodically, throughout the second portion of the total operating period, determining an operational performance margin of the engine operating condition based on the sensed engine operating condition;

periodically, throughout the second portion of the total operating period, updating the second control table stored in the memory based on the determined operational performance margin to obtain a periodically updated second control table; and controlling operating of the gas turbine engine throughout the second portion of the total operating period utilizing the periodically updated second control table.

17. The engine controller according to claim 16, wherein the periodically determining comprises a period of one cycle of the engine, and the periodically updated second control table is updated after each one cycle of the engine.

18. The engine controller according to claim 12, wherein the operational aspect comprises a fuel flow percentage between a pilot fuel flow split of fuel to be provided to a pilot mixer and a main fuel flow split of the fuel to be provided to a main mixer.

* * * * *